United States Patent
Tanizumi et al.

(10) Patent No.: US 9,300,954 B2
(45) Date of Patent: Mar. 29, 2016

(54) SURROUNDING INFORMATION-OBTAINING DEVICE FOR WORKING VEHICLE

(71) Applicant: TADANO LTD., Kagawa (JP)

(72) Inventors: Kazuya Tanizumi, Takamatsu (JP); Iwao Ishikawa, Takamatsu (JP); Kazuaki Tsuda, Takamatsu (JP); Shuji Fujiwara, Takamatsu (JP); Masayuki Munekiyo, Takamatsu (JP)

(73) Assignee: TADANO LTD., Kagawa (JP)

( * ) Notice: Subject to any disclaimer, the term of this patent is extended or adjusted under 35 U.S.C. 154(b) by 0 days.

(21) Appl. No.: 14/429,753

(22) PCT Filed: Sep. 19, 2013

(86) PCT No.: PCT/JP2013/075373
§ 371 (c)(1),
(2) Date: Mar. 19, 2015

(87) PCT Pub. No.: WO2014/046213
PCT Pub. Date: Mar. 27, 2014

(65) Prior Publication Data
US 2015/0249821 A1  Sep. 3, 2015

(30) Foreign Application Priority Data

Sep. 21, 2012 (JP) ................... 2012-207769
Nov. 29, 2012 (JP) ................... 2012-260730
Nov. 29, 2012 (JP) ................... 2012-260731
Feb. 5, 2013 (JP) ................... 2013-020350
Feb. 5, 2013 (JP) ................... 2013-020351
Aug. 2, 2013 (JP) ................... 2013-160884

(51) Int. Cl.
*H04N 13/02* (2006.01)
*H04N 17/00* (2006.01)
(Continued)

(52) U.S. Cl.
CPC ................ *H04N 17/002* (2013.01); *B60R 1/00* (2013.01); *B66C 13/00* (2013.01); *B66C 13/46* (2013.01);
(Continued)

(58) Field of Classification Search
CPC ...... B66C 13/46; B66C 13/16; B66C 19/007; B66C 13/44; B66C 13/48; B66C 13/18; B66C 13/40; B66C 15/065; B66C 23/28; B66C 13/06; B66C 13/085; B66C 13/12
USPC ................ 348/46; 345/420; 702/152; 703/7; 212/270, 273, 276, 278
See application file for complete search history.

(56) References Cited

U.S. PATENT DOCUMENTS 6,170,681 B1 * 1/2001 Yoshimatsu .......... B66C 23/905
                                                            212/278
6,308,844 B1 * 10/2001 Okada ..................... B66C 13/08
                                                            212/270
(Continued)

FOREIGN PATENT DOCUMENTS

EP  2256574 A1   12/2010
JP  H04-184203 A  7/1992
(Continued)

OTHER PUBLICATIONS

International Search Report; PCT/JP2013/075373; Nov. 5, 2013.
(Continued)

*Primary Examiner* — Gims Philippe
(74) *Attorney, Agent, or Firm* — Studebaker & Brackett PC

(57) ABSTRACT

At an end portion of a telescopic boom of a crane, a stereo camera which measures a distance from the end portion to an object is provided, and an image-processing controller which obtains three-dimensional position information of the object based on the crane as reference from measurement data to the object by the stereo camera is provided, and three-dimensional position information of an object in a surrounding area centering on the crane by the moving the telescopic boom is obtained.

17 Claims, 26 Drawing Sheets

(51) Int. Cl.
  *B66C 13/46* (2006.01)
  *B66C 23/88* (2006.01)
  *G01C 21/34* (2006.01)
  *G01C 21/36* (2006.01)
  *G06K 9/00* (2006.01)
  *G06T 7/00* (2006.01)
  *B66C 13/00* (2006.01)
  *G01C 11/06* (2006.01)
  *B60R 1/00* (2006.01)

(52) U.S. Cl.
  CPC ............... *B66C 23/88* (2013.01); *G01C 11/06* (2013.01); *G01C 21/3469* (2013.01); *G01C 21/3667* (2013.01); *G01C 21/3697* (2013.01); *G06K 9/00624* (2013.01); *G06T 7/0042* (2013.01); *G06T 7/0075* (2013.01); *G06T 2207/30252* (2013.01)

(56) References Cited

U.S. PATENT DOCUMENTS

| | | | | |
|---|---|---|---|---|
| 2008/0004898 | A1* | 1/2008 | Hubler | G06Q 10/06 703/7 |
| 2011/0010033 | A1 | 1/2011 | Asahara et al. | |
| 2013/0013251 | A1* | 1/2013 | Schoonmaker | B66C 13/46 702/152 |
| 2013/0299440 | A1* | 11/2013 | Hermann | B66C 13/46 212/276 |
| 2013/0300740 | A1* | 11/2013 | Snyder | G06F 3/016 345/420 |
| 2014/0224755 | A1* | 8/2014 | Eriksson | B66C 13/06 212/273 |

FOREIGN PATENT DOCUMENTS

| | | |
|---|---|---|
| JP | 2000-111657 A | 4/2000 |
| JP | 2002-176641 A | 6/2002 |
| JP | 2004-069583 A | 3/2004 |
| JP | 2007-015814 A | 1/2007 |
| JP | 2008-033819 A | 2/2008 |
| JP | 2009-205226 A | 9/2009 |
| JP | 2010-241548 A | 10/2010 |
| JP | 2010-248777 A | 11/2010 |
| WO | 2009/107430 A1 | 9/2009 |

OTHER PUBLICATIONS

International Preliminary Report on Patentability; PCT/JP2013/075373; Jan. 19, 2015.

* cited by examiner

IMAGE
IN FIRST POSITION

CONVERTED IMAGE
IN SECOND POSITION

SURROUNDING INFORMATION-OBTAINING DEVICE FOR WORKING VEHICLE

TECHNICAL FIELD

The present invention relates to a surrounding information-obtaining device for a working vehicle which obtains three-dimensional position information of an object in a surrounding area of the working vehicle.

BACKGROUND ART

Conventionally, a stereo camera device which includes a stereo camera on a front face of a boom of a working machine, and stereoscopically photographs a work object in front of the working machine is known (see Patent Literature 1).

The working machine includes a lower travelling body, an upper turning body which is provided on the lower travelling body, a boom which is provided in the upper turning body and capable of being luffed, a jib which is provided at an end portion of the boom, an arm which is provided at an end portion of the jib, a crusher which is provided at an end portion of the arm, and a pair of stereo cameras which is provided on a front face of the boom.

The pair of stereo cameras faces forward, stereoscopically photographs a work object to be crushed in front of the working machine, and obtains a depth in a front-back direction of the work object by stereoscopic photography.

PRIOR ART DOCUMENT

Patent Literature

Patent Literature 1: Japanese Patent Application Publication No. 2010-248777

SUMMARY OF THE INVENTION

Technical Problem

However, such a working machine only stereoscopically photographs a work object in front thereof, and therefore, there is a problem in that it is not possible to obtain three-dimensional position information of each object in a surrounding area centering on the working machine.

An object of the present invention is to provide a surrounding information-obtaining device for a working vehicle which obtains three-dimensional position information of an object in a surrounding area of the working vehicle.

Solution to Problem

A surrounding information-obtaining device for a working vehicle according to the present invention is characterized in that the surrounding information-obtaining device for the working vehicle includes a three-dimensional position-measuring device which is provided at an end portion of a boom of the working vehicle and measures a positional relationship between the end portion and an object, and a three-dimensional position information-obtaining device which obtains three-dimensional position information of the object from the measurement data of positions of the end portion of the boom and the object measured by the three-dimensional position-measuring device, and the three-dimensional position information-obtaining device obtains three-dimensional position information of an object in a surrounding area of the working vehicle while moving the boom.

Advantageous Effects of the Invention

According to the present invention, it is possible to obtain three-dimensional position information of an object in a surrounding area of a working vehicle throughout a wide range.

BRIEF DESCRIPTION OF DRAWINGS

FIG. 10 is an explanatory diagram which shows a map displayed on a monitor and the like.

DESCRIPTION OF EMBODIMENTS

Hereinafter, examples of an embodiment of a surrounding information obtaining-device for a working vehicle according to the present invention will be explained with reference to the drawings.

EXAMPLES

First Example

Figure 1:
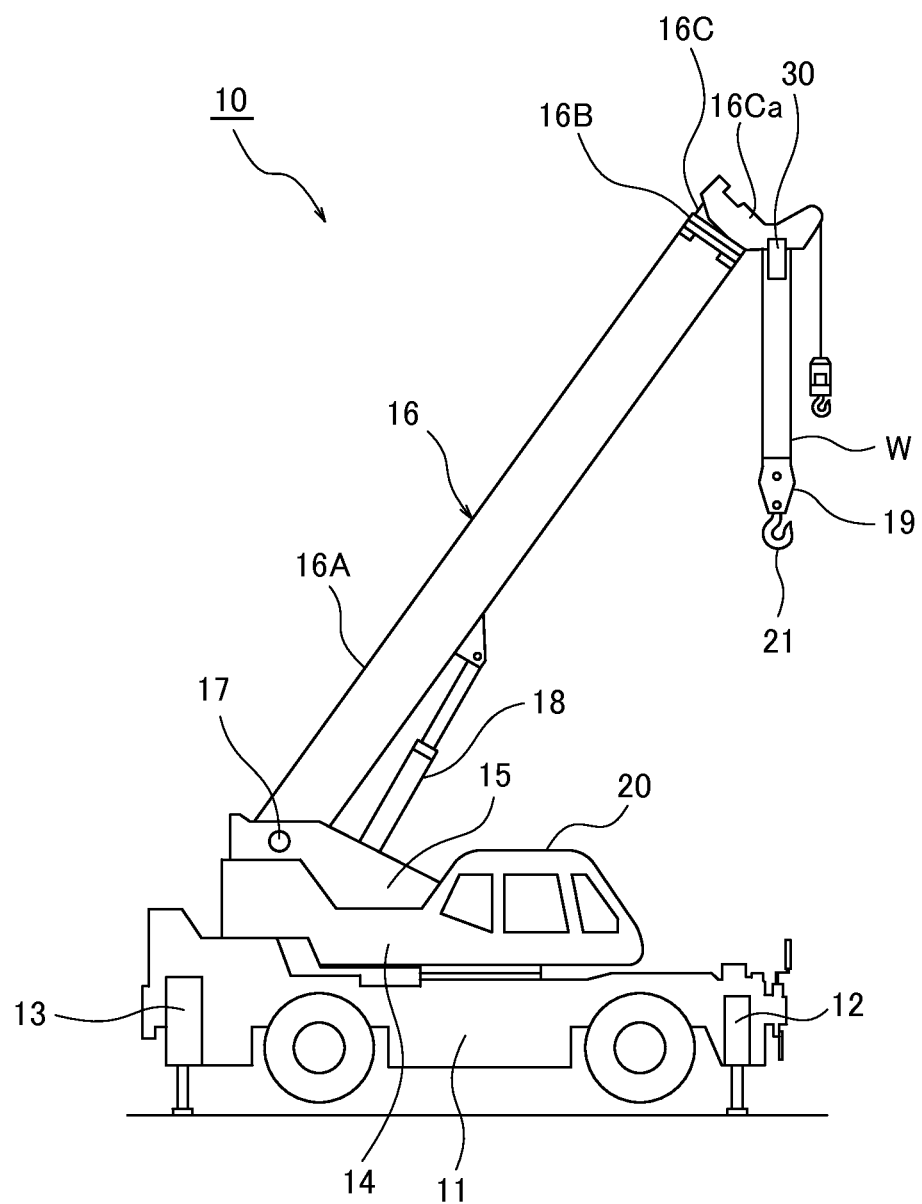
FIG. 1 is a side view which shows a mobile crane in which a surrounding information-obtaining device according to the present invention is mounted.

In FIG. 1, a rough terrain crane 10 as a crane (working vehicle) in which a surrounding information-obtaining device is mounted is shown. The rough terrain crane 10 (hereinafter, referred to as a crane) includes a carrier 11 which is a main body of a vehicle having a travel function, a right-and-left pair of front outriggers 12 which is provided on a front side of the carrier 11, a right-and-left pair of back outriggers 13 which is provided on a back side of the carrier 11, a turntable 14 which is installed to be horizontally turnable in an upper part of the carrier 11, a cabin 20 which is provided in the turntable 14, a telescopic boom (boom) 16 which is installed at a bracket 15 which is fixed to the turntable 14, and the like.

A base end part of the telescopic boom 16 is installed via a support shaft 17, and the telescopic boom 16 is capable of being luffed centering on the support shaft 17. Between the bracket 15 and the telescopic boom 16, a cylinder 18 for luffing is inserted, and the telescopic boom 16 is luffed by telescopic motion of the cylinder 18 for luffing.

The telescopic boom 16 has a base boom 16A, an intermediate boom 16B, and an end boom 16C, and in this order they are combined in a stereoscopic-manner from outside to inside in the base boom 16A. Additionally, the telescopic boom 16 is telescopic by a telescopic cylinder (not shown).

At an end portion (boom head) 16Ca of the end boom 16C, a sheave (not shown) is provided, a wire rope (hereinafter, referred to as wire) W is wound around the sheave, and a hook block 19 is hung by the wire W. In the hook block 19, a hook 21 is installed.

The wire W is wound and released by a not-shown winch.

Figure 2:
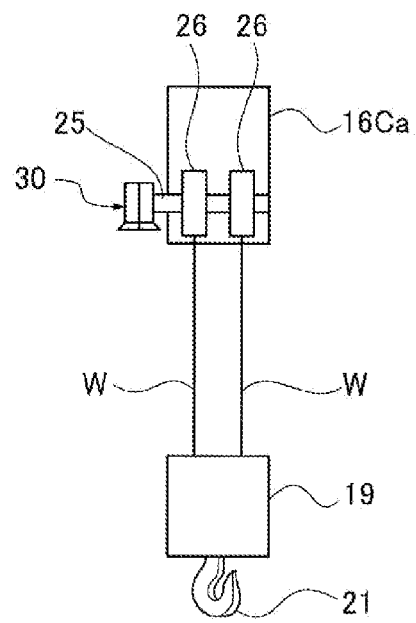
FIG. 2 is an explanatory diagram which shows a stereo camera which is provided at an end portion of a telescopic boom.

At the end portion 16Ca of the end boom 16C, as shown in FIG. 2, a stereo camera (three-dimensional position-measuring device) 30 constituted of a TV camera, or the like is installed at a sheave shaft 25 via a not-shown damper. The stereo camera 30 faces directly downward, and is capable of inclining at an arbitrary angle with respect to a vertical axis in a tilt direction and a pan direction. Additionally, orientation of the stereo camera 30 is not changed by the not-shown damper due to the wind, or the like. Please note that 26 denotes a sheave.

Operation of inclination (orientation) of the stereo camera 30 is performed by a not-shown operating part in the cabin 20. An inclination angle of the stereo camera 30 is detected by a tilt angle-detecting sensor S1 (see FIG. 3) and a pan angle-detecting sensor S2.

Figure 3:
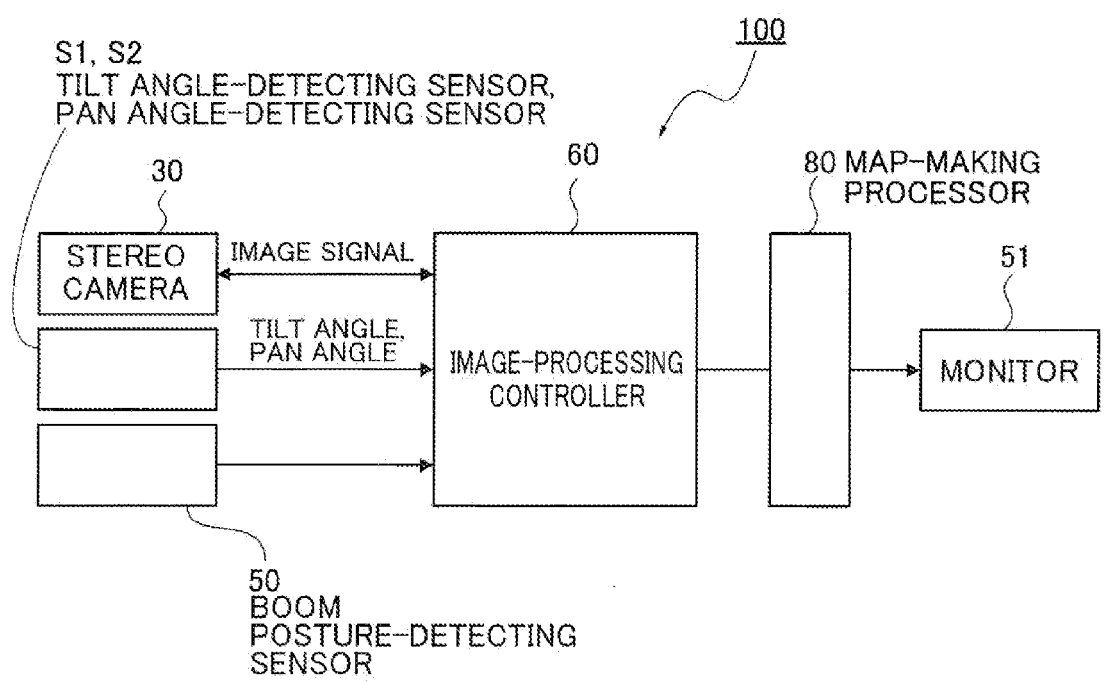
FIG. 3 is a block diagram which shows a configuration of a surrounding information-obtaining device.

FIG. 3 is a block diagram which shows a configuration of a surrounding information-obtaining device 100.

The surrounding information-obtaining device 100 includes the stereo camera 30 which is installed at the end portion 16Ca of the telescopic boom 16, a boom posture-detecting sensor 50 which detects a posture of the telescopic boom 16, the tilt angle-detecting sensor S1 and the pan angle-detecting sensor S2 which detect an inclination angle of the stereo camera 30, an image-processing controller 60 as a three-dimensional position information-obtaining device which processes an image signal outputted from the stereo camera 30 and extracts feature points of imaged objects, and obtains three-dimensional position information of each object based on the feature points, a map-making processor 80 which makes a map in a surrounding area of the crane 10 based on the three-dimensional position information obtained by the image-processing controller, and a monitor (display) 51 which displays a map made by the map-making processor 80 or the like.

[Boom Posture-Detecting Sensor]

The boom posture-detecting sensor 50 detects an extended length of the telescopic boom 16, a luffing angle of the telescopic boom 16, and a turning angle of the telescopic boom 16, and has a sensor for each of them (not shown) which detects them.

[Image-Processing Controller]

The image-processing controller 60 processes a position of an object in the surrounding area of the crane 10 as three-dimensional position information from an image imaged by the stereo camera 30. In the present example, an example is shown in which a feature point of a surrounding object is obtained as three-dimensional position information of the surrounding object based on a reference point of the crane 10.

As shown in FIG, 4, the image-processing controller 60 includes first and second frame memories 61L, 61R which each store an image imaged by each of left and right monocular cameras (imaging device) 30L, 30R of the stereo camera 30, feature point extractors 62L, 62R which each extract a feature point of an object (in explanation of FIG. 5, a feature point Pa of an object 1) from the image stored in each of the first and second frame memories 61L, 61R, reference point extractors 63L, 63R which each extract three reference points P1, P2, P3 (see FIG. 5) shown by, for example, cross marks which are marked on an upper surface of the carrier 11 of the crane 10 from the image stored in each of the first and second frame memories 61L, 61R, a camera coordinate system position calculator 64 which calculates a position of the feature point in a coordinate system of the stereo camera 30 from the feature point extracted by each of the feature point extractors 62L, 62R, a camera coordinate system reference point position calculator 65 which calculates positions of the three reference points in the camera coordinate system from the three reference points extracted from each of the reference point extractors 63L, 63R, a correlation calculator 66 which calculates a correlation between the camera coordinate system and a coordinate system of the crane from the positions of the three reference points calculated by the camera coordinate system reference point position calculator 65, a crane coordinate system position calculator 67 which calculates a position in the crane coordinate system by converting the position of the feature point calculated by the camera coordinate system position calculator 64 based on the correlation calculated by the correlation calculator 66, a memory 68 which stores the position calculated by the crane coordinate system position calculator 67, and a controller 70 which controls each of the first and second frame memories 61L, 61R to store an image imaged by each of the monocular cameras 30L, 30R based on a detection signal detected by the boom posture-detecting sensor 50.

The controller 70 performs control of extracting processing of the feature point extractors 62L, 62R and the reference point extractors 63L, 63R, control of calculation processing of the camera coordinate system position calculator 64 and the camera coordinate system reference point position calculator 65, control of calculation of the correlation of the correlation calculator 66, and control of calculation of the crane coordinate system position calculator 67.

The first and second frame memories 61L, 61R, the feature point extractors 62L, 62R, and the camera coordinate system position calculator 64 constitute an image recognition device.

Please note that a principle in which from an image of an object imaged by a stereo camera, a three-dimensional position of the object is obtained will be explained in third and fourth examples, and therefore, it is omitted here.

[Map-Making Processor]

The map-making processor 80 obtains a height of an object in a surrounding area of the crane 10 from three-dimensional position information obtained by the image-processing controller 60, and makes a map as viewed in plan view which shows height information of the object. And a map made by the map-making processor 80 is displayed on the monitor 51.

Additionally, the map-making processor 80 forms the object into a shape as viewed in plan view based on an outline of the object stored in the memory 68 and data of the three-dimensional position, and makes a map which shows a position and a height of the object by a color according to the height of the object, and has an image memory 81 which stores the made map.

[Operation]

Next, operation of the surrounding information-obtaining device 100 as structured above will be explained.

Figure 6:
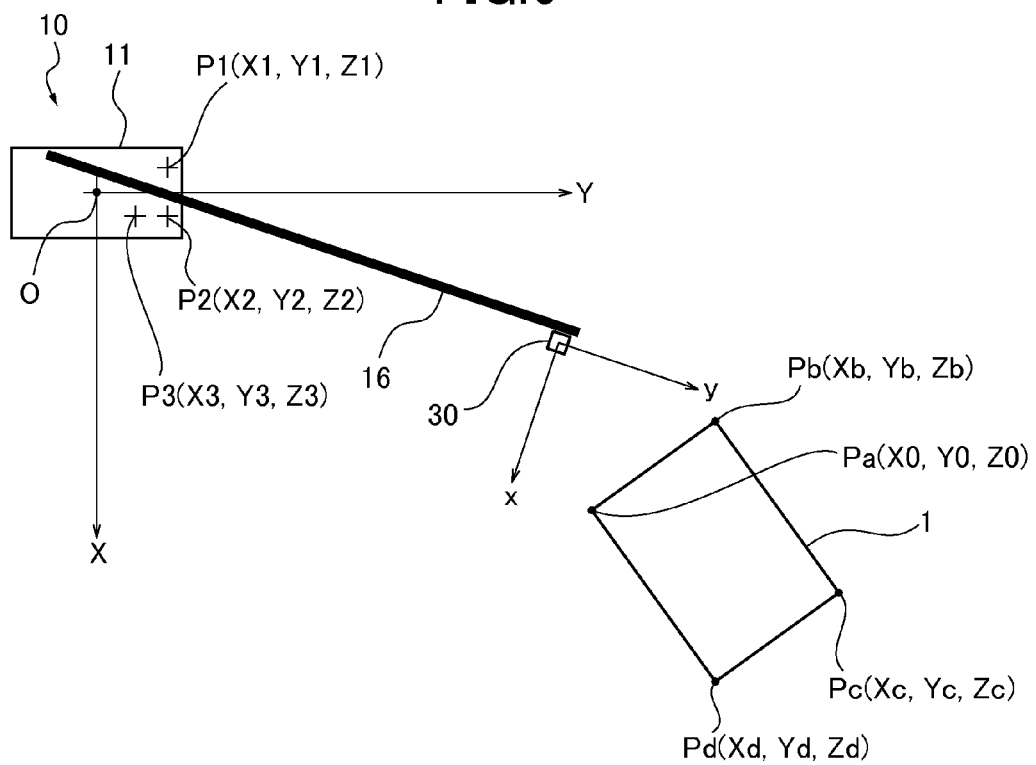
FIG. 6 is a plan view which shows a coordinate system of a crane, a coordinate system of a stereo camera, and a building.

On the upper surface of the carrier 11 of the crane 10, as described above, the three reference points P1, P2, P3 are marked, and positions of the reference points P1, P2, P3 are set, as shown in FIG. 6, as P1=(X1, Y1, Z1), P2=(X2, Y2, Z2), and P3=(X3, Y3, Z3) in advance, as positions in an X-Y-Z coordinate system of the crane 10 in which a position of a turning center of the telescopic boom 16 on the upper surface of the carrier 11 is taken as an origin.

Figure 5:
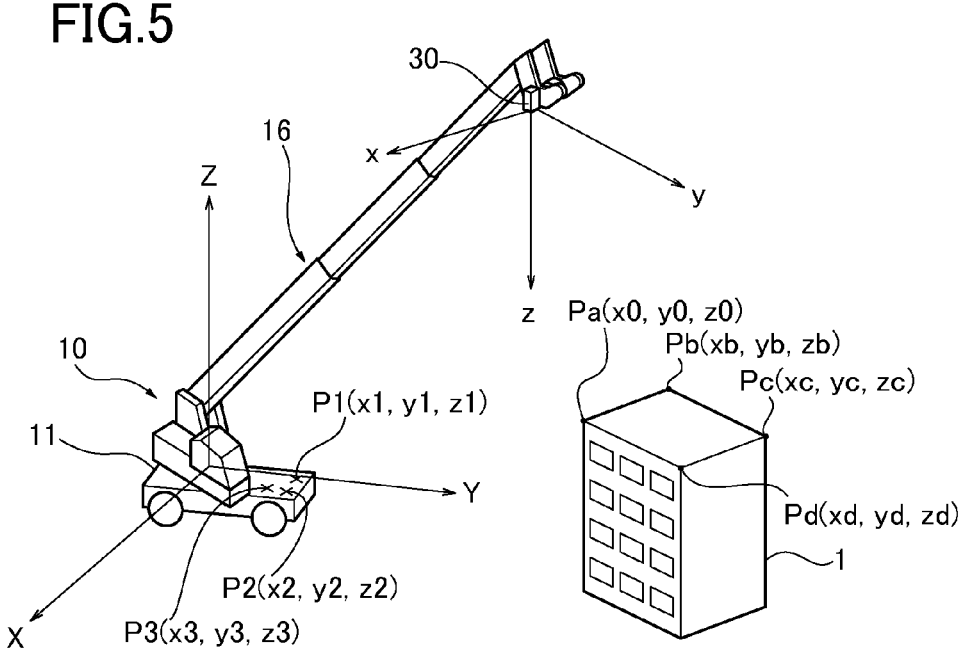
FIG. 5 is an explanatory diagram which shows a positional relationship among a crane, a stereo camera, and a building, and coordinate systems.

Firstly, the crane 10 is fixed to a work position as shown in FIG. 1. Next, the telescopic boom 16 is raised and extended as shown in FIG. 5, and the stereo camera 30 performs imaging. One of imaged images is displayed on the monitor 51.

When the telescopic boom 16 is extended to a predetermined length, the controller 70 controls each of the first and second frame memories 61L, 61R to store an image imaged by the stereo camera 30.

Here, for example, referring to FIG. 5, an explanation will be made assuming that the monocular cameras 30L, 30R of the stereo camera 30 image a building 1 as a construction (an object) and the crane 10.

When an image imaged by each of the monocular cameras 61L, 61R of the stereo camera 30 is stored in each of the first and second frame memories 61L, 61R, each of the feature point extractors 62L, 62R extracts a feature point of the image stored in each of the first and second frame memories 61L, 61R.

In the extraction of the feature point, for example, an outline (edge) of an image of the building 1 is extracted by image processing, and points Pa to Pd, which are corner portions of the building 1, are extracted by image processing as feature points of the outline. Since extraction of the outline and feature points by image processing is a known technique, explanation thereof is omitted here.

Please note that in a case where each of the feature point extractors 62L, 62R extracts the outline of the building 1, and a position of the height imaged by the stereo camera 30 is low, a region for extracting the outline is roughened, and calculation speed can be increased.

When each of the feature point extractors 62L, 62R extracts the feature points Pa to Pd of the building 1, based on positions of the feature points Pa to Pd on the image imaged by each of the monocular cameras 30L, 30R, the camera coordinate system position calculator 64 obtains positions of the feature points Pa (x0, y0, z0) to Pd (xd, yd, zd) in a camera coordinate system in which a focal position of the monocular camera 30L is taken as an origin, for example.

On the other hand, each of the reference point extractors 63L, 63R extracts the three reference points P1, P2, P3 on the carrier 11 of the crane 10 from the image stored in each of the first and second frame memories 61L, 61R. Extraction of each of the three reference points P1, P2, P3 is extracted by a known pattern-matching method, for example.

When each of the reference point extractors 63L, 63R extracts the three reference points P1, P2, P3, based on positions of the reference points P1, P2, P3 on the image imaged by each of the monocular cameras 30L, 30R, the camera coordinate system reference point position calculator 65 obtains positions (x1, y1, z1), (x2, y2, z2), (x3, y3, z3) in the camera coordinate system in which the focal position (not shown) of the monocular camera 30L is taken as the origin, by a later-described principle of position calculation by the stereo camera.

From the positions (x1, y1, z1), (x2, y2, z2), (x3, y3, z3) of the reference points P1, P2, P3 in the camera coordinate system obtained by the camera coordinate system reference point calculator 65 and the positions (X1, Y1, Z1), (X2, Y2, Z2), (X3, Y3, Z3) of the reference points P1, P2, P3 in the X-Y-Z coordinate system of the crane which are set in advance as shown in FIG. 6, the correlation calculator 66 obtains a correlation between the positions in the camera coordinate system and the positions in the crane coordinate system.

Here, by defining the positions of the three reference points on the crane 10 in the camera coordinate system in which the focal positon of the monocular camera 30L is taken as reference, it is possible to define a position of the origin in the camera coordinate system in the crane coordinate system and orientation of the monocular camera 30L, and therefore, it is possible to obtain the correlation.

From the correlation obtained by the correlation calculator 66, the crane coordinate system position calculator 67 obtains a position of the feature point Pa (x0, y0, z0) in the camera coordinate system as a position (X0, Y0, Z0) in the crane coordinate system. Similarly, the crane coordinate system position calculator 67 obtains positions of the feature points Pb to Pd as positions (Xb, Yb, Zb) to (Xd, Yd, Zd) in the crane coordinate system.

The positions (X0, Y0, Z0) to (Xd, Yd, Zd) in the crane coordinate system of the feature points Pa to Pd obtained by the crane coordinate system position calculator 67 are stored in the memory 68.

Figure 7:
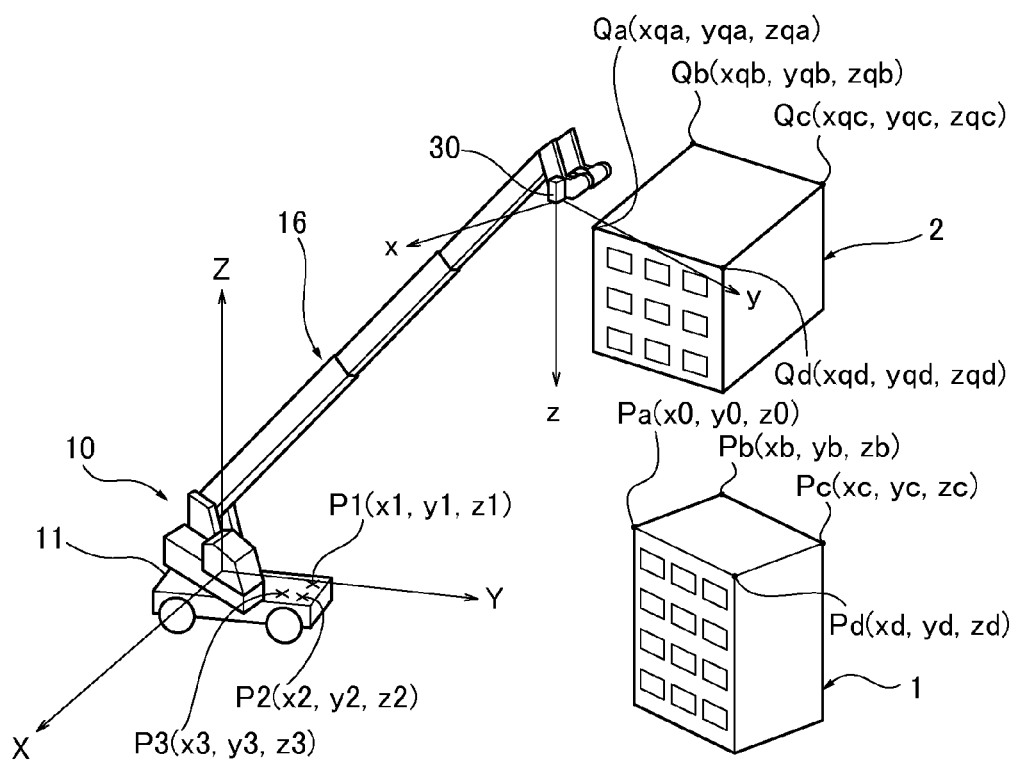
FIG. 7 is an explanatory diagram which shows a crane, and buildings in a surrounding area of the crane.

Next, the telescopic boom 16 is turned, and, for example, each time the telescopic boom 16 is rotated by a predetermined angle, each of the first and second frame memories 61L, 61R stores an image imaged by the stereo camera 30. Each time the image is stored in each of the first and second frame memories 61L, 61R, the above operation is repeated. Outline and feature points of buildings are extracted, and three-dimensional positions of the feature points are obtained, and therefore, three-dimensional position information of all objects in the surrounding area centering on the crane 10 is obtained. In the surrounding area of the crane 10, for example, as shown in FIG. 7, in a case where there are two buildings 1, 2, feature points Pa to Pd, Qa to Qd of the buildings 1, 2 are extracted, positions of the feature points Pa to Pd, Qa to Qd are obtained as positions (x0, y0, z0) to (xd, yd, zd), (xqa, yqa, zqa) to (xqd, yqd, zqd) in the camera coordinate system, and then three-dimensional positions (X0, Y0, Z0) to (Xd, Yd, Zd), (Xqa, Yqa, Zqa) to (Xqd, Yqd, Zqd) in the crane coordinate system are obtained (see FIG. 8).

Figure 8:
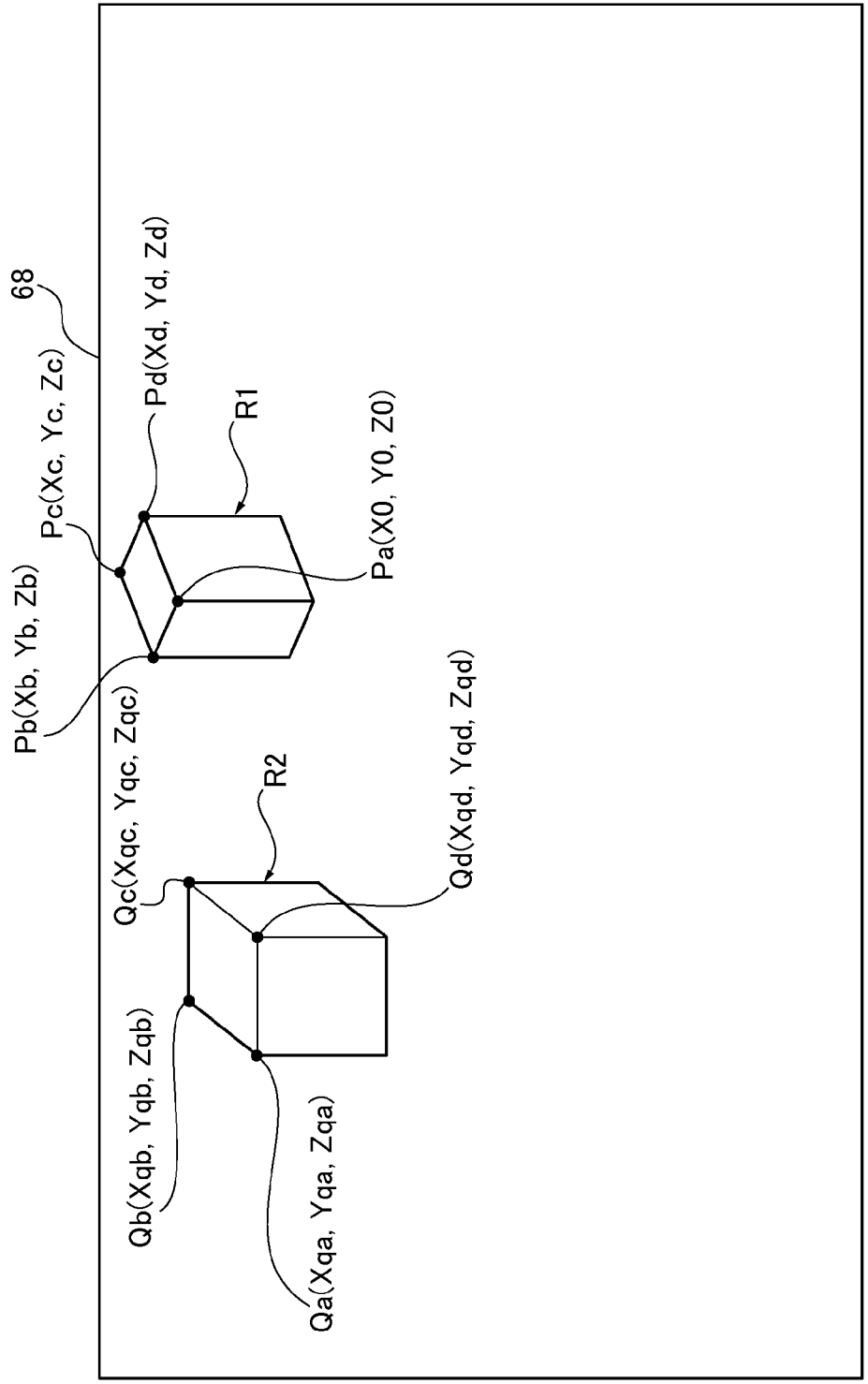
FIG. 8 is an explanatory diagram which shows outlines of buildings stored in a memory and feature points of the outlines.

In the memory 68, for example, as shown in FIG. 8, outlines RE R2 of the buildings 1, 2, and the positions of the feature points Pa to Pd, Qa to Qd of the buildings 1, 2 are stored.

The map-making processor 80 makes a map in which the buildings 1, 2 are viewed in plan view, based on the outlines RE R2 of the buildings 1, 2, and the positions (X0, Y0, Z0) to (Xd, Yd, Zd), (Xqa, Yqa, Zqa) to (Xqd, Yqd, Zqd) of the feature points Pa to Pd, Qa to Qd of the buildings 1, 2. That is, the outlines R1, R2 are converted to outlines which are expressed in an X-Y coordinate system in which a Z coordinate value is zero.

Figure 9:
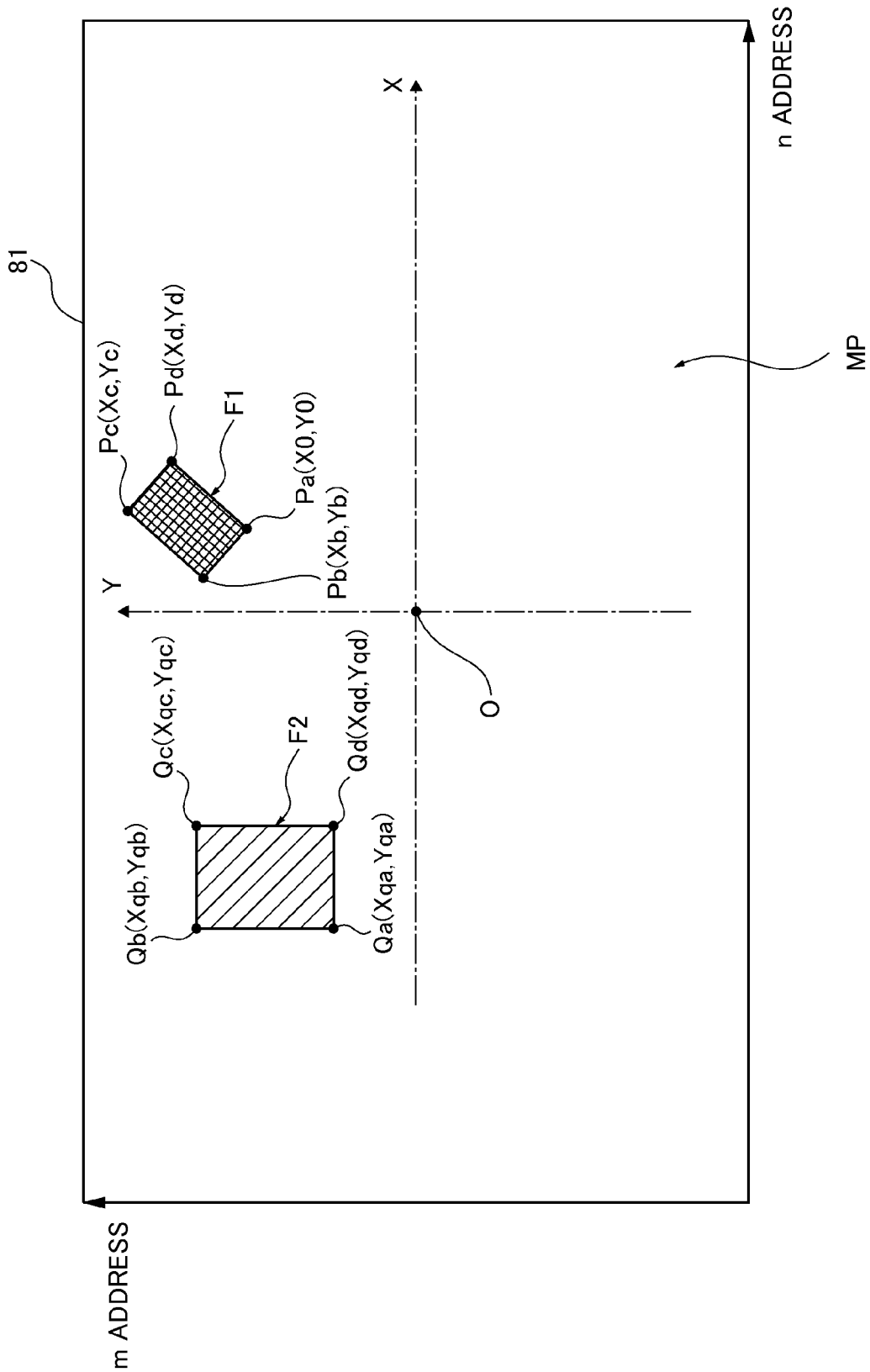
FIG. 9 is an explanatory diagram which shows a map in which buildings are viewed in a plan view stored in an image memory.

In particular, the map-making processor 80, as shown in FIG. 9, stores only positions (X0, Y0) to (Xd, Yd) in the X-Y coordinate system of the three-dimensional positions of the feature points Pa to Pd of the outline R1 of the building 1 in the image memory 81 so as to correspond to n, m addresses of the image memory 81. Additionally, a line connecting the feature points Pa to Pd is stored in the image memory 81 as an outline F1 of the building 1 as viewed in plan view. Furthermore, an inside of the outline F1 is colored according to a Z coordinate value, and stored in the image memory 81.

Similarly, only positions (Xqa, Yqa) to (Xqd, Yqd) in the X-Y coordinate system of the three-dimensional positions of the feature points Qa to Qd of the outline R2 of the building 2 are stored in the image memory 81 so as to correspond to the n, m addresses of the image memory 81. A line connecting the feature points Qa to Qd is stored in the image memory 81 as an outline F2 of the building 2 as viewed in plan view. Additionally, an inside of the outline F2 is colored according to a Z coordinate value, and stored in the image memory 81.

Thus, in the image memory 81, a map MP shown in FIG. 9 is made and stored.

Incidentally, as to color representing the height, for example, a case where the height is lower than 10 m is colored in pale blue, a case where the height is equal to or more than 10 m and less than or equal to 20 m is colored in blue, a case where the height is equal to or more than 20 m and less than or equal to 30 m is colored in purple, and a case where the height is equal to or more than 30 m is colored in red.

For example, in a case where the height of the building 1 is 21 m, the inside of the outline F1 is colored in purple, and in a case where the height of the building 2 is 18 m, the inside of the outline F2 is colored in blue.

Figure 10:
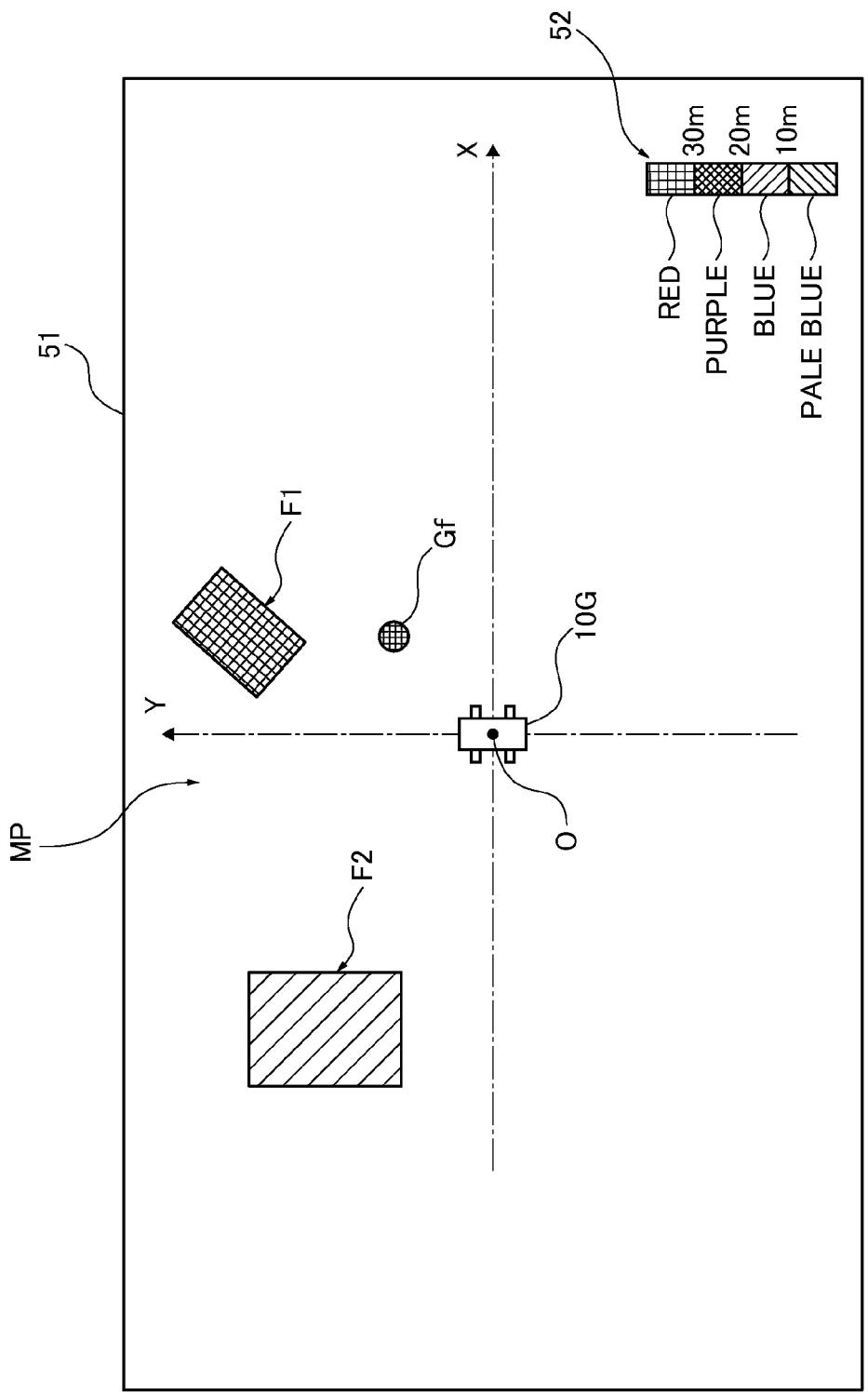

The map MP stored in the image memory 81 is displayed on the monitor 51 as shown in FIG. 10. On the monitor 51, a graphic image 10G representing the crane 10 is displayed in an origin position O in the X-Y coordinate system, and a bar-graph image 52 representing a relationship between color and height is displayed, and therefore, an operator recognizes the height of the buildings 1, 2 by the color. The graphic image 10G and the bar-graph image 52 can be stored in the image memory 81 beforehand.

After the map MP is stored in the image memory 81, from an image of the hook block 19 imaged by the stereo camera 30, the controller 70 controls the feature point extractors 62L, 62R to extract an outline of the image of the hook block 19.

Then, similarly to the above, a three-dimensional position of the outline of the hook block 19 in the crane coordinate system is obtained, and from the obtained three-dimensional position, a three-dimensional position of the hook 21 is obtained, and the three-dimensional position of the hook 21 is stored in the memory 68.

The map-making processor 80 composites a graphic image Gf representing the hook 21 and the map MP stored in the memory 68 so as to correspond to the three-dimensional position of the hook 21 stored in the memory 68, and displays the composite image on the monitor 51 as shown in FIG. 10. Color of the graphic image Gf is determined based on a height position of the hook 21, that is, a Z coordinate value. For example, if the height of the hook 21 is equal to or more than 30 m, the graphic image Gf is colored in red.

In a case of extraction of the outline of the hook block 19, storing the image imaged by the stereo camera 30 in the first and second frame memories 61L, 61R is performed per a certain time (for example, per 0.1 seconds), and therefore, it is possible to display the graphic image Gf so as to correspond to movement of the hook 21 in real time.

Thus, on the monitor 51, on the map MP as shown in FIG. 10, the outlines F1, F2 representing the buildings 1, 2, the graphic image Gf of the hook 21, and the graphic image 10G of the crane 10 are displayed so as to correspond to each position, and therefore, it is possible to recognize a positional relationship between the surrounding buildings 1, 2 and the crane 10, and a positional relationship between the hook 21 and the buildings 1, 2 at a glance. In addition, it is possible to recognize the height of the buildings 1, 2 and the height of the hook 21, and therefore, it is easy to ensure safety at the time of working, and it is possible to enhance working efficiency.

In the present example, since three-dimensional position information of the building 1 is obtained based on the images of the reference points P1, P2, P3 on the carrier 11 of the crane 10 imaged by the stereo camera 30, it is not necessary to obtain a position of the end portion of the telescopic boom 16 by a sensor which detects a posture of a boom, or the like. Accordingly, without influence of deflection of the telescopic boom 16 or the like, it is possible to precisely obtain three-dimensional position information of the buildings 1, 2 in the surrounding area centering on the crane 10, and make an accurate map. Additionally, the height is shown in color, and therefore, it is possible to recognize the height of the buildings 1, 2 and the hook 21 visually.

Figure 11:
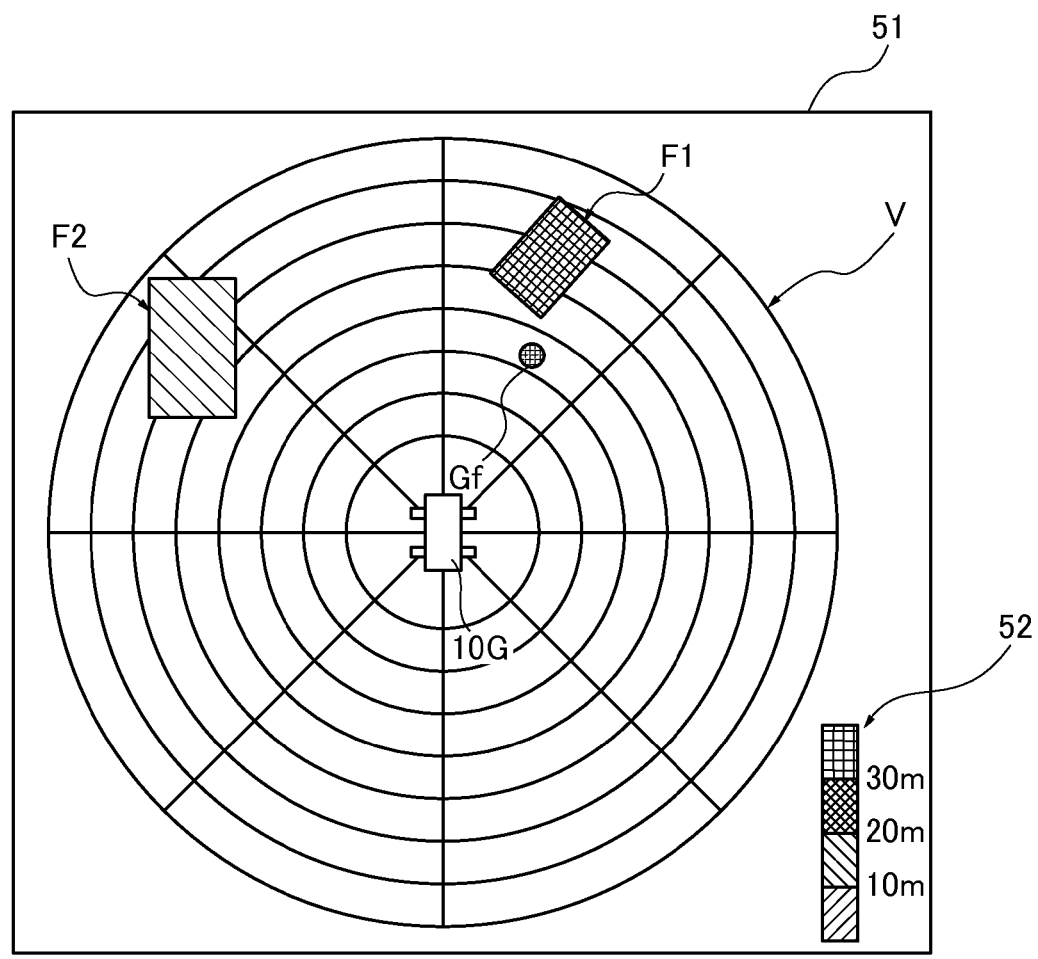
FIG. 11 is an explanatory diagram of a case where a map displayed on a monitor is expressed in polar coordinates.

In the above example, the map MP is shown in the X-Y coordinate system; however, as shown in FIG. 11, it can be displayed in polar coordinates V on the monitor 51. If it is thus displayed in the polar coordinates V, in a case of turning the telescopic boom 16, a position to which the hook 21 is moved by this turn is recognized clearly, and it is easier to ensure safety.

Additionally, by providing a selector switch, a display in the X-Y coordinate system and a display in a polar coordinate system can be switched.

In the above example, at the end portion of the telescopic boom 16 the stereo camera 30 is provided; however, the stereo camera 30 does not necessarily need to be provided. For example, a monocular camera is provided at the end portion, and from an image imaged by the monocular camera which is obtained by movement of the telescopic boom 16, based on a principle of the stereo camera, three-dimensional position information of the buildings 1, 2 can be obtained.

Additionally, in place of the stereo camera 30, at the end portion of the telescopic boom 16, a monocular camera and a laser ranging device are provided, and based on measurements of the laser ranging device, the height of an object is obtained, an outline of the object is extracted from an image imaged by the monocular camera, and the outline can be converted to an outline as viewed in plan view based on the height of the object.

In the above example, the display of the height is shown by different colors; however, it is not limited thereto, and, for example, it can be shown by shading a same color, or by using a hatch, a dotted line, or the like. Or it can be shown by a numeric value.

Additionally, in the above example, the three reference points P1, P2, P3 are set on the carrier 11 of the crane 10, and the three-dimensional position information of the buildings 1, 2 is obtained; however, if the position of the end portion of the telescopic boom 16 is obtained from the luffing angle, the length, the turning angle, and a deflection amount of the telescopic boom 16, it is possible to obtain three-dimensional positions of the buildings 1, 2 in which a position of the turning center of the telescopic boom 16 is taken as an origin, without setting the three-dimensional points P1, P2, P3.

Additionally, in a case where the stereo camera 30 faces directly downward (in the vertical direction) and performs imaging, if a Z-axis in the camera coordinate system and a Z-axis in the crane coordinate system_are in the same direction, only two reference points may be provided.

Figure 12:
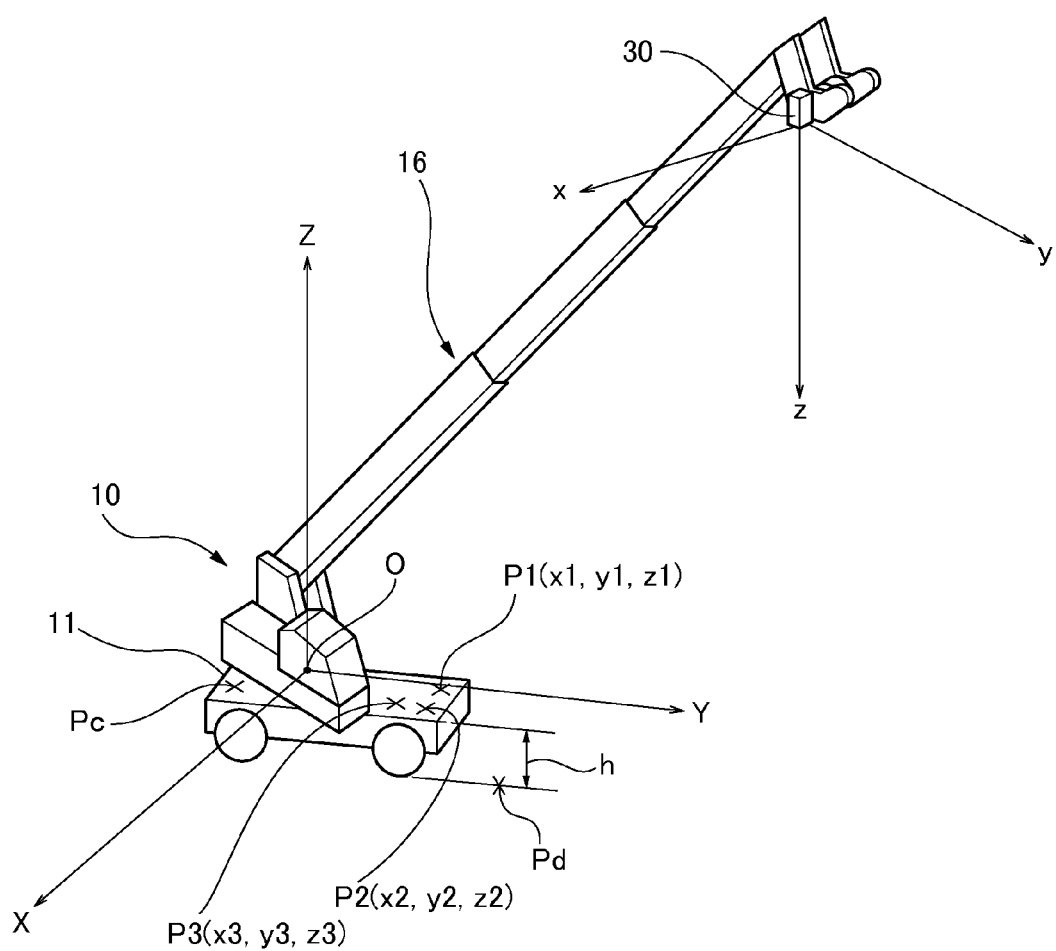
FIG. 12 is an explanatory diagram which shows a case of setting a position other than a turning center of a boom for an origin.

In the above example, the X-Y-Z coordinate system of the crane 10 in which the position of the turning center of the telescopic boom 16 on the upper surface of the carrier 11 is taken as the origin is set, and the three-dimensional position information of the buildings 1, 2 is obtained; however, as shown in FIG. 12, for example, in a coordinate system in which a predetermined position Pc on the upper surface of the carrier 11 of the crane 10 or a predetermined position Pd on the ground is taken as an origin, three-dimensional position information of a building can be obtained. Please note that h denotes a height from the ground to the upper surface of the carrier 11.

In this case, as to the predetermined position Pc, or the predetermined position Pd, it is necessary to obtain a position in the X-Y-Z coordinate system in advance. That is, if a position in the X-Y-Z coordinate system in which the position of the turning center O of the telescopic boom 16 on the upper surface of the carrier 11 is taken as the origin is known, even if the predetermined position is in any position, and coordinates in which a position of the predetermined position is taken as an origin are set, it is possible to obtain three-dimensional position information of the buildings 1, 2 in the coordinates.

Figure 13:
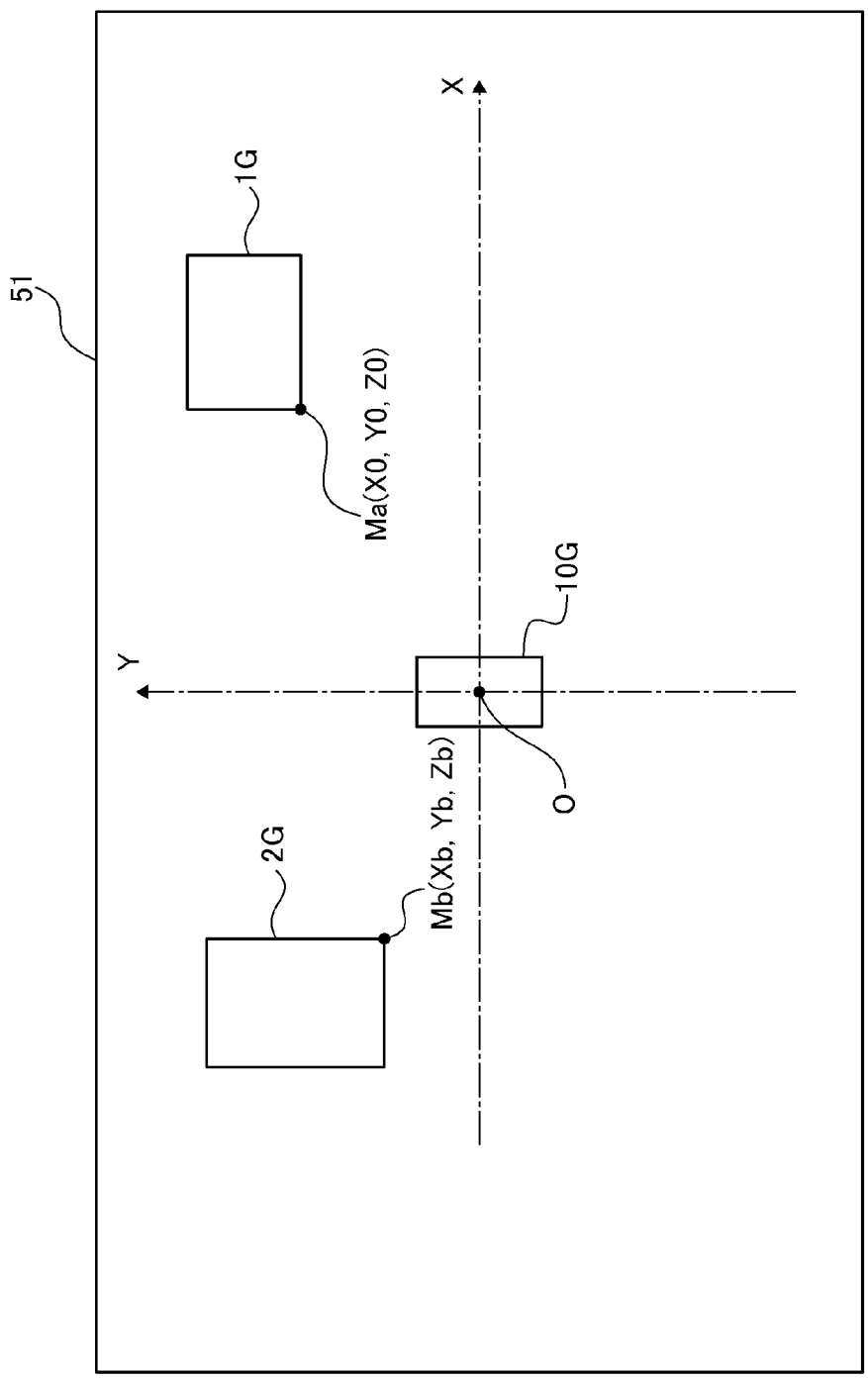
FIG. 13 is an explanatory diagram which shows another example of a display screen of a monitor.

In this example, four feature points of each building are extracted and a map in which the buildings 1, 2 are viewed in plan view is made; however, only one feature point is extracted, and from the extracted feature point, three-dimensional position information of each building is obtained, and as shown in FIG. 13, building images 1G, 2G as viewed in plan view, mark images Ma, Mb representing feature points of the buildings, and coordinates expressing three-dimensional positions of the feature points can be displayed on the monitor 51. Additionally, in a center portion of the monitor 51, a crane image 10G is displayed, and the crane image 10G can be a graphic image, for example, an image of the crane 10 imaged by the monocular camera 30L of the stereo camera 30.

Second Example

[Explanation of Principle of Measurement]

Figure 14:
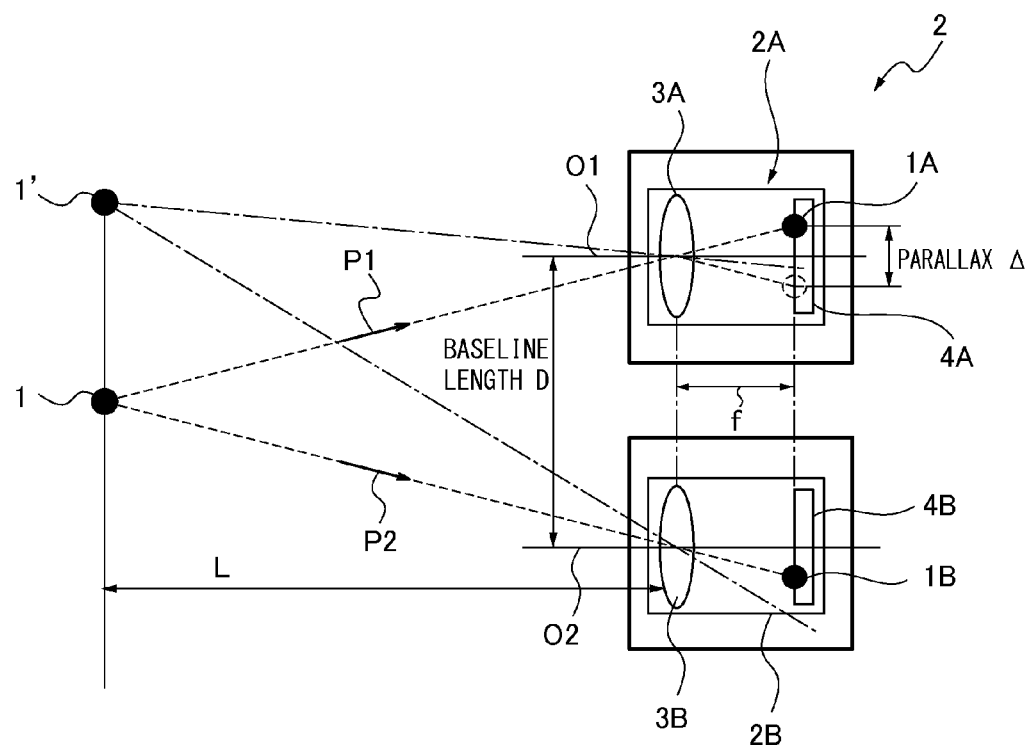
FIG. 14 is an explanatory diagram which shows a principle of a distance measurement to a photographic object by a stereo camera.

FIG. 14 shows a principle of measurement in which a distance to a photographic object is measured by using a stereo camera.

In FIG. 14, 1 denotes a photographic object, 2 denotes a stereo camera. Here, the stereo camera 2 is constituted of two monocular CCD cameras 2A, 2B.

The CCD cameras 2A, 2B have imaging lenses 3A, 3B, and two-dimensional image sensors 4A, 4B, respectively. Reference signs O1, O2 denote optical axes of the imaging lenses 3A, 3B, respectively, and a distance between the optical axes O1, O2 is a baseline length D. Additionally, f denotes a focal length of each of the imaging lenses 3A, 3B, and L denotes a distance from the photographic object 1 to the stereo camera 2.

In a case where the photographic object 1 is imaged by the stereo camera 2, light fluxes from the photographic object 1 as shown by arrows P1, P2 are incident on the imaging lenses 3A, 3B, respectively, and are formed as photographic object images 1A, 1B on the two-dimensional image sensors 4A, 4B, respectively. Image-forming positions of the photographic object images 1A, 1B on the two-dimensional image sensor 4A, 4B are different, and therefore, parallax $\Delta$ occurs.

By obtaining the parallax $\Delta$, by use of a calculation expression $L=D\times(f/\Delta)$ using a principle of triangulation, the distance L to the photographic object 1 is obtained.

The parallax $\Delta$ is obtained by obtaining a pixel position of each of the photographic object images 1A, 1B with respect to a pixel center on each of the optical axes O1, O2 regarding each of the CCD cameras 2A, 2B.

In the above explanation, a case where the photographic object 1 exists in a position symmetric to the CCD cameras 2A, 2B has been explained; however, as shown by reference sign 1', also in a case where a photographic object 1' exists in a position asymmetric to the CCD cameras 2A, 2B, although the calculation expression becomes complex, it is possible to obtain a distance to the photographic object 1' by use of the same principle.

The principle of measuring the distance to the photographic object 1' has been explained, and additionally, by use of this principle, it is possible to obtain a three-dimensional position of the photographic object 1 with respect to the CCD cameras 2A, 2B.

Firstly, regarding the CCD camera 2A (or 2B), an image position (pixel position (x', y')) of the photographic object 1' with respect to an optical axis center (image center) in a two-dimensional coordinates is obtained on a screen. A pixel position of the photographic object 1' of the image center is taken as (x' y'), and a distance from the photographic object 1' to an intersection (origin) of a plane which includes the photographic object 1' and is perpendicular to an optical axis of the camera with the optical axis center is taken as (x, y). Then, by use of calculation expressions x=(x'/f)×L, y=(y'/f)×L, regarding the CCD camera 2A (or 2B), it is possible to obtain the distance (x, y) from the above intersection (origin).

Therefore, the distance L to the plane which includes the photographic object 1'and is perpendicular to the optical axis of the CCD camera 2A (or 2B), and the distance (x, y) from the origin to the photographic object 1' are obtained. That is, a three-dimensional position of the photographic subject 1' with respect to an origin of 2A (2B) is obtained.

[Explanation of Crane in Second Example]

Hereinafter, a second example of a surrounding information-obtaining device using this principle will be explained with reference to FIGS. 15 to 17.

Figure 15:
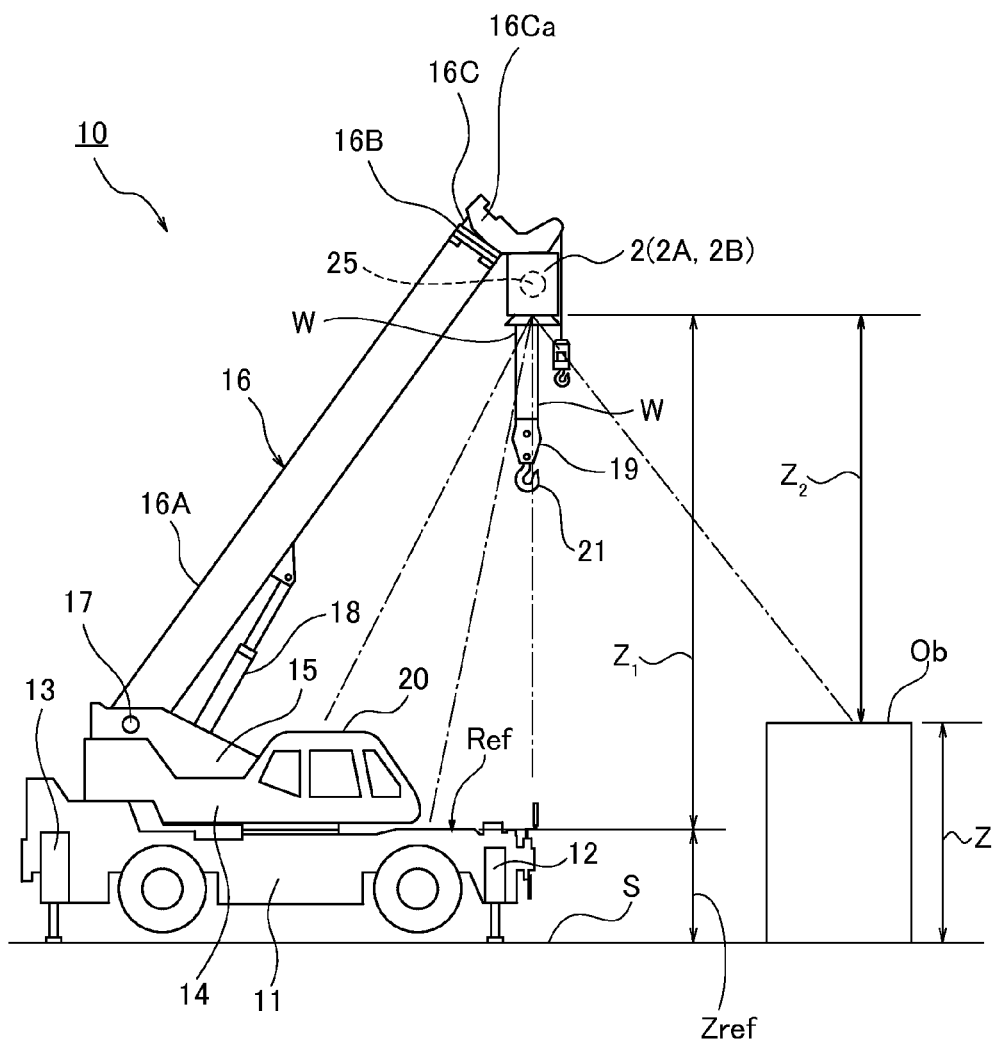
FIG. 15 is an explanatory diagram of a case where a height measurement is performed by a stereo camera which is provided in a crane.

As shown in FIG. 15, at the sheave shaft 25 of the boom head 16Ca of the end boom 16C, the above-described stereo camera (three-dimensional position-measuring device) 2 is installed, and the stereo camera 2 is installed at the boom head 16Ca similarly to the stereo camera 30 in the first example.

[Surrounding Information-Obtaining Device]

Figure 16:
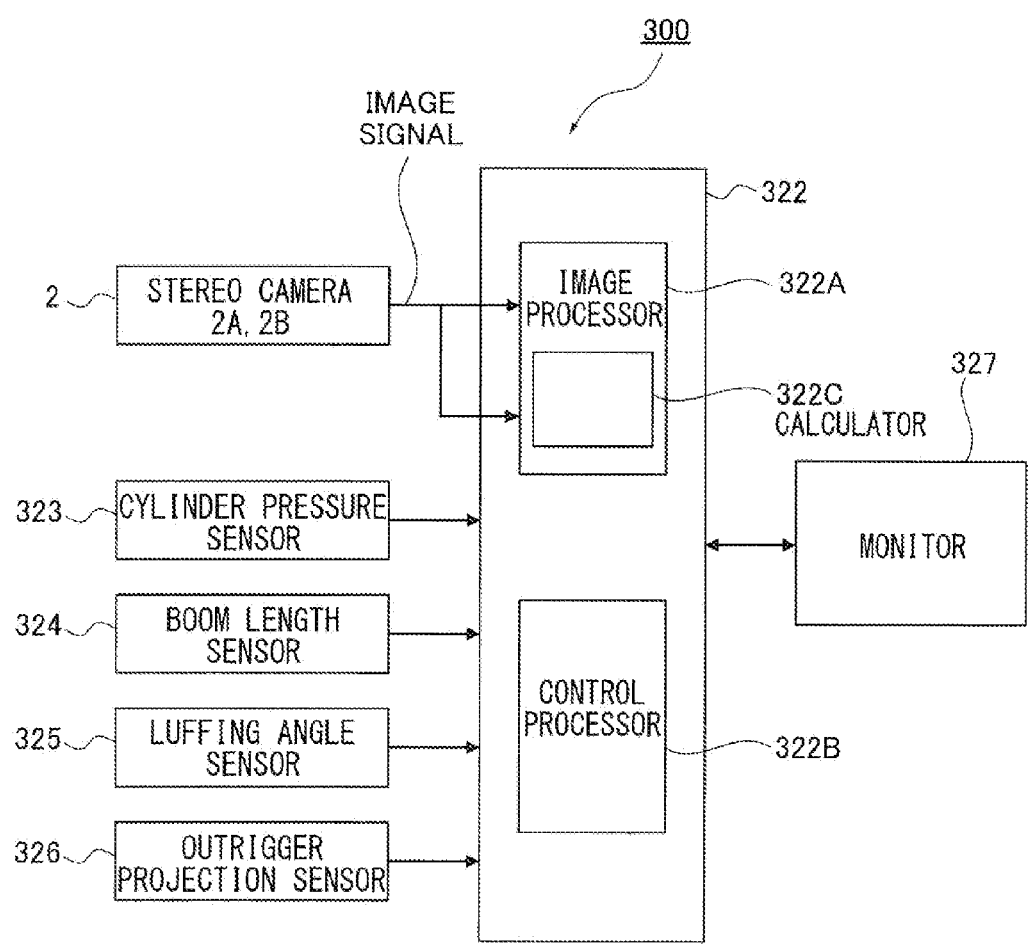
FIG. 16 is a block diagram which shows a configuration of a surrounding information-obtaining device in a second example.

FIG. 16 is a block diagram which shows a configuration of a surrounding information-obtaining device 300 in the second example.

In FIG. 16, 322 denotes a calculation processor. To the calculation processor 322, an image signal from the stereo camera 2, a sensor signal from each of a cylinder pressure sensor 323, a boom length sensor 324, a luffing angle sensor 325, and an outrigger projection sensor 326 are inputted.

The surrounding information-obtaining device 300 shown in FIG. 16 includes the stereo camera 2 which is provided at the end portion 16Ca of the telescopic boom 16, the boom length sensor 324, the luffing angle sensor 325, the outrigger projection sensor 326, the calculation processor (three-dimensional position information-obtaining device) 322, a monitor (display) 327, and the like.

The calculation processor 322 has an image processor 322A, and a control processor 322B. The image processor 322A includes a calculator 322C having a later-described function. The control processor 322B performs control processing in accordance with a sensor signal from each of the sensors, and outputs information necessary for control to the monitor 327 as necessary.

To the image processor 322A, an image signal from the stereo camera 2 is inputted, and the image processor 322A performs image processing on the image signal from the stereo camera 2 accordingly, and outputs a display signal to the monitor 327. Thus, an image shown in FIG. 17 is displayed on the monitor 327.

Here, in a screen G of the monitor 327, an image W' of the wire W, an image 19' of the hook block 19, an image 11' of a front part of the carrier 11, an image 12' of the outrigger 12, an image Ref' of a later-described reference object Ref, and an image Ob' of a later-described a target object Ob are shown.

Please note that since the stereo camera 2 is constituted of the CCD cameras (imaging device) 2A, 2B, two screens are provided in parallel in the monitor 327, and an image imaged by each of the CCD cameras 2A, 2B can be displayed concurrently, or one screen is provided, and a screen selector switch can be provided so as to display an image imaged by one of the CCD cameras 2A, 2B.

The surrounding information-obtaining device 300 calculates a three-dimensional positon of a camera in a crane coordinate system with respect to a reference position of the crane 10 by output of the sensors 323 to 326, and therefore, by use of a three-dimensional position of the target object Ob in a camera coordinate system obtained by the cameras 2A, 2B, it is possible to calculate a position of the of the object Ob in the crane coordinate system.

Here, by imaging a reference position of the crane 10 by the cameras 2A, 2B, and taking a correlation between the obtained reference position of the crane 10 in the camera coordinate system and the reference position of the crane 10 in the crane coordinate system, it is possible to obtain a position of an object without depending on the output of the sensors 323 to 326, and it is possible to obtain an accurate position of the object without a camera position calculation error due to the output of the sensors. Hereinafter, a method thereof will be explained.

The image processor 322A has a function which determines whether the image Ref' of the reference object Ref and the image Ob' of the target object Ob appear together in an image imaged by the stereo camera 2 by image recognition.

The reference object Ref is formed as a cross mark on a surface in a front part of the carrier 11, here. The image processor 322A determines in which pixel position of each of two-dimensional image sensors 4A, 4B the image Ref' of the reference object Ref exists by, for example, a widely-known pattern-matching method from an imaged image obtained by each of the CCD cameras 2A, 2B.

Similarly, the image processor 322A determines in which pixel position of each of two-dimensional image sensors 4A, 4B the image Ob' of the target object Ob a position of which is desired to be measured exists by, for example, the widely-known pattern matching method from the imaged image obtained by each of the CCD cameras 2A, 2B.

In a case where there are a plurality of target objects Ob, a position of a target object Ob which is desired to be measured is specified. In a case where the monitor 327 is a touch-screen type, specifying the target object Ob can be performed by an operator pointing to it on the screen G each time.

Please note that in a case where the monitor 327 is not the touch-screen type, for example, outlines of the target objects Ob are automatically extracted, and the target objects Ob can be specified.

Hereinafter, a case where the image Ref' of the reference object Ref and the image Ob' of the target object Ob are included in an image imaged by the stereo camera 2 and a case where one of the image Ref' of the reference object Ref and the image Ob' of the target object Ob is not included in an image imaged by the stereo camera 2 will be explained, respectively.

Please note that in the following explanation, for simplicity, from among three-dimensional positions of a target object to be measured, measurement of a height is focused on in particular and will be explained.

[Case where Image Ref' and Image Ob' are Included in Image]

Here, as shown in FIG. 15, by use of an imaged image in which the reference object Ref representing a reference height Zref from the ground S is included, the calculator 322C obtains parallax Δ from each pixel position of the image Ref' of the reference object Ref by the above-described principle of distance measurement by the stereo camera, and by use of the parallax Δ, calculates a distance $Z_1$ in a height direction from the stereo camera 2 to the reference object Ref.

Similarly, the calculator 322C obtains parallax Δ from each pixel position of the image Ob' of the target object Ob a height of which is desired to be measured, and by use of the parallax Δ, calculates a distance $Z_2$ in the height direction from the stereo camera 2 to the target object Ob.

And by use of the distances $Z_1$, $Z_2$ in the height direction thus obtained, and the reference height Zref from the ground S, a height Z from the ground S to the target object Ob is obtained by the following expression.

$$Z=(Z_1-Z_2)+Zref$$

That is, by use of an image in which the reference object Ref representing the reference height Zref from the ground S is included, the calculator 322C calculates the distance $Z_1$ in the height direction from the stereo camera 2 to the reference object Ref, and by use of an image in which the target object Ob is included, calculates the distance $Z_2$ in the height direction from the stereo camera 2 to the target object Ob, and calculates the height Z from the ground S to the target object Ob by subtracting the distance $Z_2$ to the target object Ob from a sum of the distance $Z_1$ in the height direction to the reference object Ref and the reference height Zref.

Please note that in a case of calculating a height of the target object Ob with respect to the reference object Ref, the calculator 322C subtracts the distance $Z_2$ in the height direction to the target object Ob from the distance $Z_1$ in the height direction to the reference object Ref.

According to the present example, it is possible to accurately obtain the height of the target object Ob where the carrier 11 of the crane 10 is taken as reference.

[Case where One of Image Ref' and Image Ob' is Not Included in Image]

Figure 18:
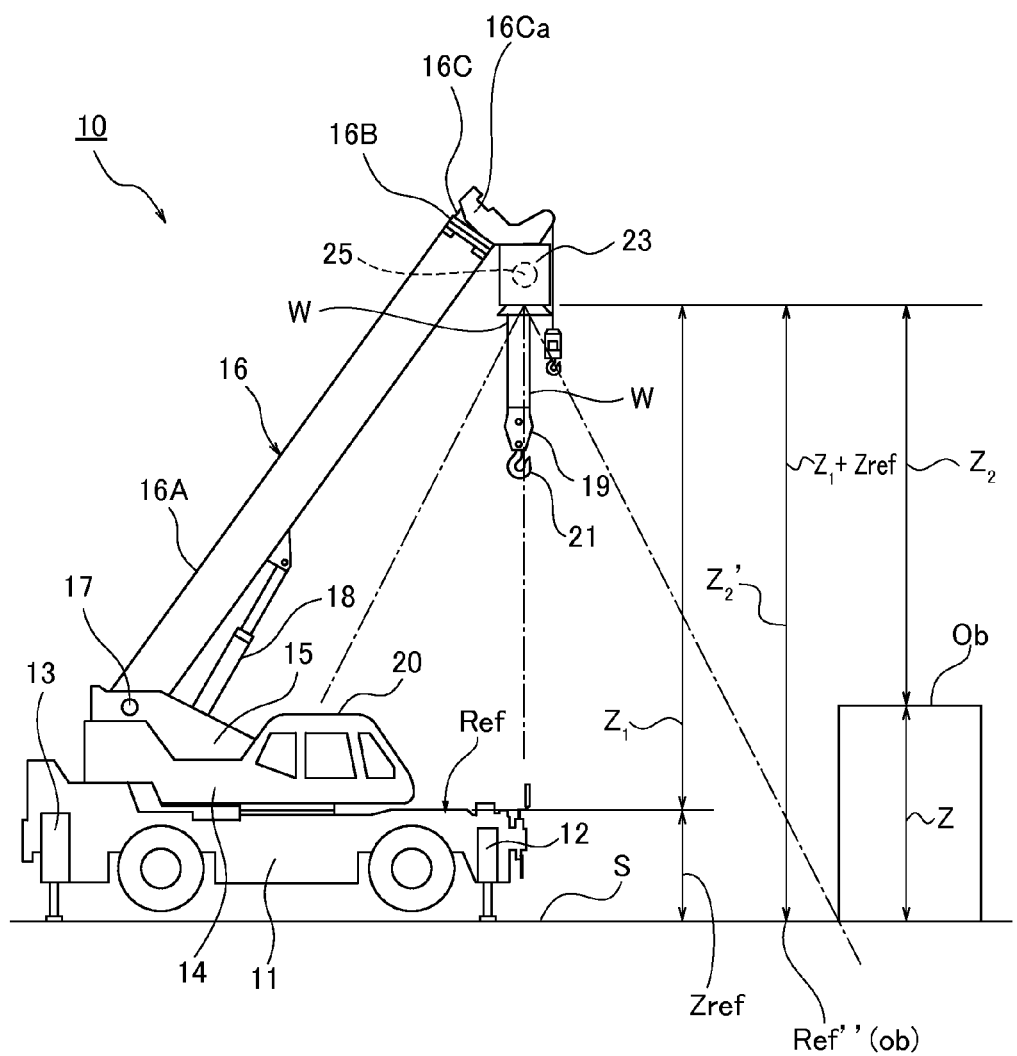
FIG. 18 is an explanatory diagram which shows a state where a target object and a reference object on a crane are not captured by a stereo camera concurrently.

As shown in FIG. 18, for example, in a case where only an image of the reference object Ref is included and an image of a building as the target object Ob is not included in an image imaged by the stereo camera 2, if this is the case, it is not possible to obtain the height of the target object Ob from the ground S.

Therefore, in this case, a target object Ob which has already been obtained is taken as new reference Ref, and a height from the ground to a target object Ob to be obtained next is calculated.

For example, in a case where on the ground S there is a cross mark index (reference object Ref") which can be used as reference such as a white line, or the like, the cross mark index (reference object Ref") such as the white line, or the like is recognized as a target object ob a height of which is to be measured, and a distance $Z_2'$ in the height direction of the target object (cross mark index (reference object Ref")) ob is obtained.

Here, if a distance to the reference object Ref on the carrier 11 of the reference object Ref" on the ground S is the same as Zref (the ground is completely horizontal), $Z_2'=Z_1+Zref$.

Then, a building or the like as a target object Ob a height of which is newly desired to be measured and the cross mark index (reference object Ref") are imaged by the stereo camera 2, and the distance $Z_2$ in the height direction of the building or the like as the target object Ob the height of which is desired to be obtained or the like and a distance $Z_1+Zref$ in the height direction to the reference object Ref" are obtained. As a result, even in a case where the target object Ob the height of which from the ground S is desired to be measured and the reference object Ref do not appear in the image imaged by the stereo camera 2 concurrently, it is possible to accurately obtain the height Z of the target object Ob from ground.

As described above, the image processor 322A performs an imaging step in which the reference object Ref representing the reference height from the ground S and the target object Ob the height of which from the ground S to be measured are imaged by use of the stereo camera 2 which is installed at the telescopic boom 16 of the crane 10, a calculating step in which the distance $Z_1$ in the height direction from the stereo camera 2 to the reference object Ref, a calculating step in which the distance $Z_2$ in the height direction from the stereo camera 2 to the target object Ob, and a calculating step in which the height Z from the ground S to the target object Ob is calculated by subtracting the distance $Z_2$ in the height direction to the target object Ob from the sum of the reference height Zref of the reference object Ref from the ground S and the distance $Z_1$ in the height direction to the reference object Ref.

Therefore, by use of the reference height Zref of the crane 10 fixed by the outriggers 12, 13, it is possible to accurately obtain the height Z of the target object Ob.

In a case where the image Ref' of the reference object Ref is not included in an image including a target object Ob a height of which from the ground S is to be newly measured, the calculator 322C performs a step in which a height Z of the target object Ob the height of which from the ground S to be newly measured is obtained by using a target object Ob an image Ob' of which is included in the image and a height of which from the ground S which has already been obtained as a new reference object Ref".

Thus, according to the second example, the reference object Ref representing the reference height from the ground S is provided at the crane 10, and therefore, even in a case where the height of the target object Ob from the ground S is measured by the stereo camera 2, it is possible to obtain an effect in which the height of the target object Ob from the ground S is accurately measured.

Figure 17:
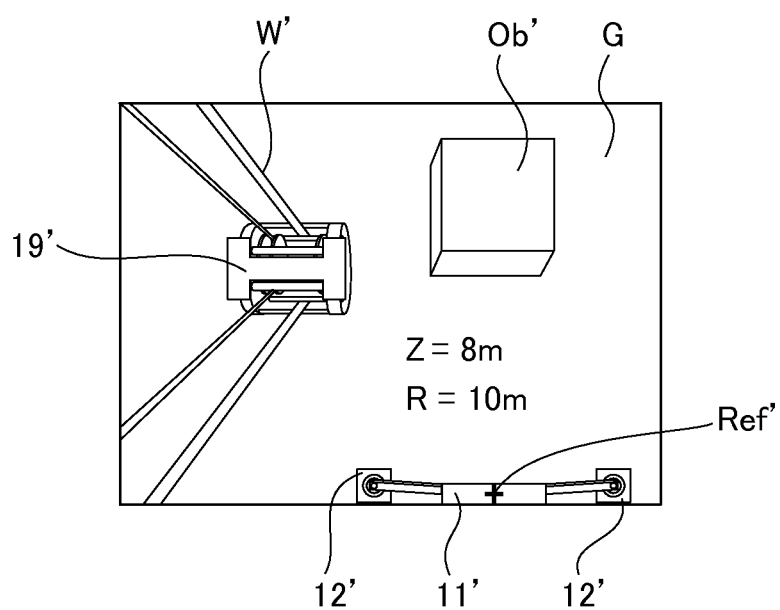
FIG. 17 is an explanatory diagram which shows one example of an image displayed on a monitor.

Please note that the height Z of the target object Ob from the ground S obtained by the calculation and a radius R (distance from a center axis of turning as the turning center of the boom 16 to the object Ob) in a position of the target object Ob are displayed on the screen G, as shown in FIG. 17.

The measurement of the height Z of the target object Ob has been explained; however, according to this example, it is possible to accurately obtain a three-dimensional position of the target object Ob with respect to the reference position of the crane 10.

That is, by use of the stereo camera 2 which is installed at the telescopic boom 16 of the crane 11 and outputs an image signal by imaging a working site, and the calculator 332C of the image processor 332A which performs an image display of the image signal from the stereo camera 2, it is possible to calculate the position of the reference object Ref with respect to the stereo camera 2 from the image in which the reference object Ref representing the reference height from the ground S is included, calculate the position of the target object Ob with respect to the stereo camera 2 from the image in which the target object Ob is included, and calculate a position of the target object Ob in three-dimensional directions with respect to the position of the reference object Ref.

The second example has been explained; however, the present invention is not limited thereto, and the following are included.

(1) In the example, the mark representing the reference object Ref is provided in the carrier 11 of the crane 10, and the reference object Ref is obtained by performing image recognition of this mark; however, the operator specifies the reference object Ref on the screen, and the reference object Ref can be obtained.

(2) Similarly, by specifying the target object Ob which is desired to be measured on the screen, the height of the target object from the ground S can be obtained.

(3) Further, without providing the mark representing the reference object Ref in the carrier 11 of the crane 10, a special shape representing the reference object Ref is formed in the crane 11, and the reference object Ref can be obtained by performing image recognition of this special shape.

(4) Such image recognition of the reference object Ref and the target object Ob is not limited to this example, and in conclusion, it is only necessary to measure a distance to the photographic object by use of the stereo camera 2.

Third Example

Figure 19:
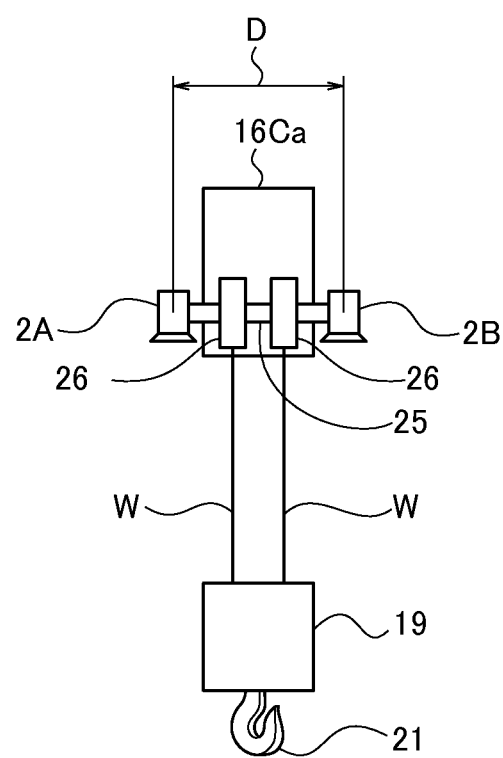
FIG. 19 is an explanatory diagram which shows two monocular monitoring cameras constituting a stereo camera in a third example.

FIG. 19 shows monocular monitoring cameras (CCD cameras) 2A, 2B constituting a stereo camera (three-dimensional position-measuring device) of a surrounding information-obtaining device in a third example. Those monitoring cameras 2A, 2B are provided at both ends of the sheave shaft 25 of the boom head 16Ca of the end boom 16C, respectively. That is, the monitoring cameras 2A, 2B are arranged at positions between which the end portion of the end boom 16C is placed in a width direction (in FIG. 19, a right-left direction: a direction perpendicular to a luffing direction of the telescopic boom 16), respectively, and a distance between the monitoring cameras 2A, 2B becomes larger. A distance between optical axes of the monitoring camera 2A, 2B is defined as the baseline length D. The monitoring cameras 2A, 2B are installed at the sheave shaft 25 similarly to the first example.

Figure 20:
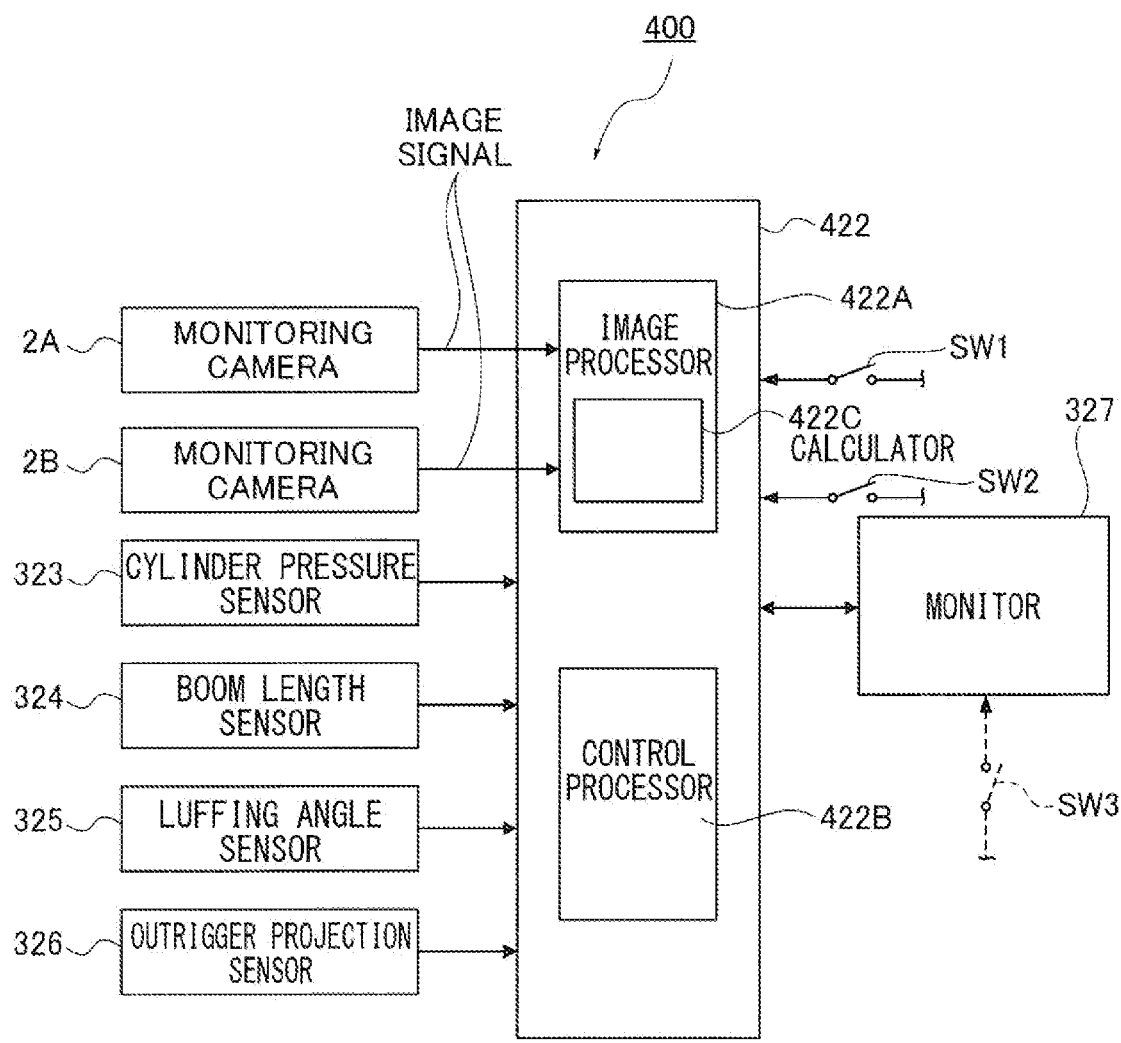
FIG. 20 is a block diagram which shows a configuration of a surrounding information-obtaining device in the third example.

A surrounding information-obtaining device 400 in the third example shown in FIG. 20 includes a calculation processor (three-dimensional position information-obtaining device) 422, a screen selector switch SW1, and an image composition-processing switch SW2. Since other than the above is similar to those in the second example, explanation thereof is omitted.

Figure 21A:
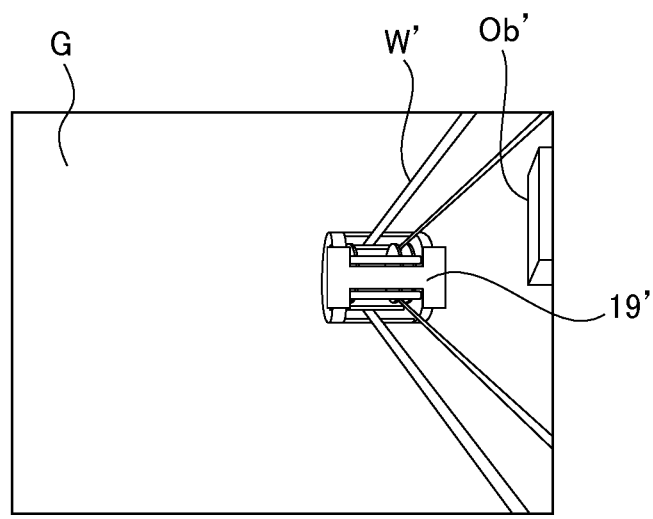
FIG. 21A is an explanatory diagram which shows an image imaged by a monitoring camera arranged on a side which is distant from a cabin.
Figure 21B:
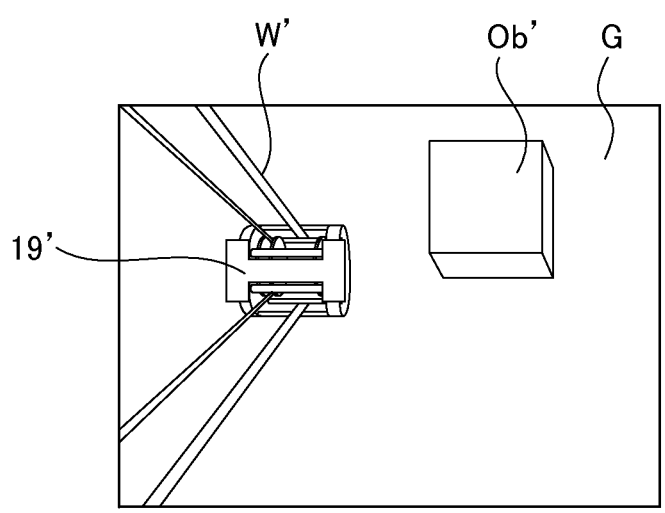
FIG. 21B is an explanatory diagram which shows an image imaged by a monitoring camera arranged on a cabin side.

When an operator operates the screen selector switch SW1, the calculation processor 422 controls a screen display to be switched from an image imaged by the monitoring camera 2B which is arranged on a side close to the cabin 20 shown in FIG. 21B to an image imaged by the monitoring camera 2A which is arranged on a side distant from the cabin 20 (monitoring camera 2A which is arranged on the left as viewed from the operator in the cabin 20), as shown in FIG. 21A.

Figure 21C:
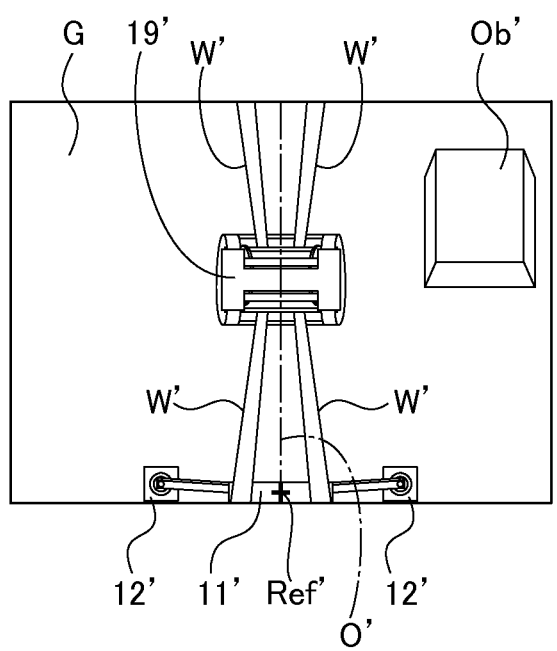
FIG. 21C is an explanatory diagram which shows a composite image in which the image shown in FIG. 21A and the image shown in FIG. 21B are composited.

When the operator operates the image composition-processing switch SW2, as shown in FIG. 21C, the image processor 422A performs image processing so as to display a composition-processed image in which the image imaged by the monitoring camera 2B and the image imaged by the monitoring camera 2A are composition-processed.

In FIG. 21C, the composition-processed image is displayed in which the hook 21 is taken as a center of the screen G, and therefore, it is convenient in a case of performing lifting work.

Here, in a case of constructing a composition-processed image, as shown in FIG. 21C, the image processor 422A performs image processing such that an image 19' of the hook block 19 is placed in a center O' in a right-left direction of the screen G, and the composition-processed image is displayed on the screen G.

In this example, an explanation has been made in which the screen selector switch S1 is provided in the calculation processor 422; however, the screen selector switch S1 can be provided in the monitor 327 as shown by a broken-line SW3.

According to the third example, when a dead spot occurs in an image imaged by one of the monitoring cameras 2A, 2B, a display of the screen G is switched to an image imaged by the other of the monitoring cameras 2A, 2B, or a composition-processed image is displayed on the screen G, and therefore, it is possible to work with as few dead spots as possible. Please note that in a case of displaying a composition-processed image on the screen G, it is preferable to remove the image 19' of the hook block 19 in terms of removing a feeling of strangeness in the composition-processed image in which an image of a portion which becomes a dead spot due to the hook block 19 and the image 19' of the hook block 19 overlap and appear.

Please note that the removal of the image 19' of the hook block 19 is performed such that, for example, an image of a portion which becomes a dead spot due to the hook block 19 is obtained and stored in a memory when it is out of the dead spot during movement of the hook block 19, and in a case of making a composition-processed image, the image of the portion which becomes the dead spot is composited and concurrently the image 19' of the hook block 19 is removed.

Please note that the image of the portion which becomes the dead spot due to the hook block 19 is displayed preferentially, and the image 19' of the hook block 19 can be a transparent image.

Further, it is possible to have a baseline length D larger compared to a case of constructing a stereo camera in which the monitoring cameras 2A, 2B are provided on one side of the boom head 16Ca, and therefore, it is possible to achieve improvement in accuracy of image processing and improvement in a later-described accuracy of height measurement.

The surrounding information-obtaining device 400 obtains a three-dimensional position of a target object Ob (see FIG. 18) similarly to the surrounding information-obtaining device 300 in the second example, and therefore, explanation thereof is omitted.

Also in the third example, it is possible to accurately obtain the three-dimensional position of the target object Ob similarly to in the second example.

The example has been explained; however, the present invention is not limited thereto, and the following are included.

(1) In the example, the monitoring cameras 2A, 2B are provided at the sheave shaft 25, and therefore, it is possible to install them without considerably changing existing components. However, an installation shaft part for installing the monitoring cameras 2A, 2B parallel to the sheave shaft 25 is provided, and the monitoring cameras 2A, 2B can be provided at the installation shaft part. Accordingly, it is possible to prevent vibration of the sheave shaft 25 from being transmitted to the monitoring cameras 2A, 2B.

(2) Additionally, in the example, the monitoring cameras are provided at the boom head (end portion) 16Ca of the telescopic boom 16; however, in order to prevent horizontal deflection of the boom 16, each of the monitoring cameras 2A, 2B can be provided at a projecting attachment member (not shown) which projects from the telescopic boom 16 to extend horizontally in its width direction. Accordingly, it is possible to have a baseline length larger compared to a case in which the sheave shaft 25 is provided.

(3) The crane 10 is once placed in a working site, and is not moved until the work is finished, and therefore, an image which is obtained in accordance with movement of the telescopic boom 16 is stored in a memory, and if an image obtained before change of the imaging range is used, even if an imaging range is changed in accordance with the movement of the telescopic boom 16, image-processing speed improves.

(4) As the height of the monitoring cameras 2A, 2B becomes higher, the target object Ob appears smaller, and therefore, it is possible to obtain a more accurate image by increasing pixel density of a processed image.

(5) In order to grasp a position of the target object Ob, by obtaining positions such as feature points of corner portions or the like of the target object Ob a plurality of times, and obtaining an average value, it is possible to achieve improvement in accuracy of obtaining the position of the target object Ob.

(6) In the example, as a composition-processed image, an image as viewed from directly above the hook 21 is displayed on the screen G; however, the composition-processed image is not limited thereto, and it is possible to make various bird's-eye images in which view point conversion has been performed, and display them. And it is possible to provide a bird's-eye image conversion switch in the image processor, and display a bird's-eye image accordingly by operation of the operator.

Fourth Example

Figure 22:
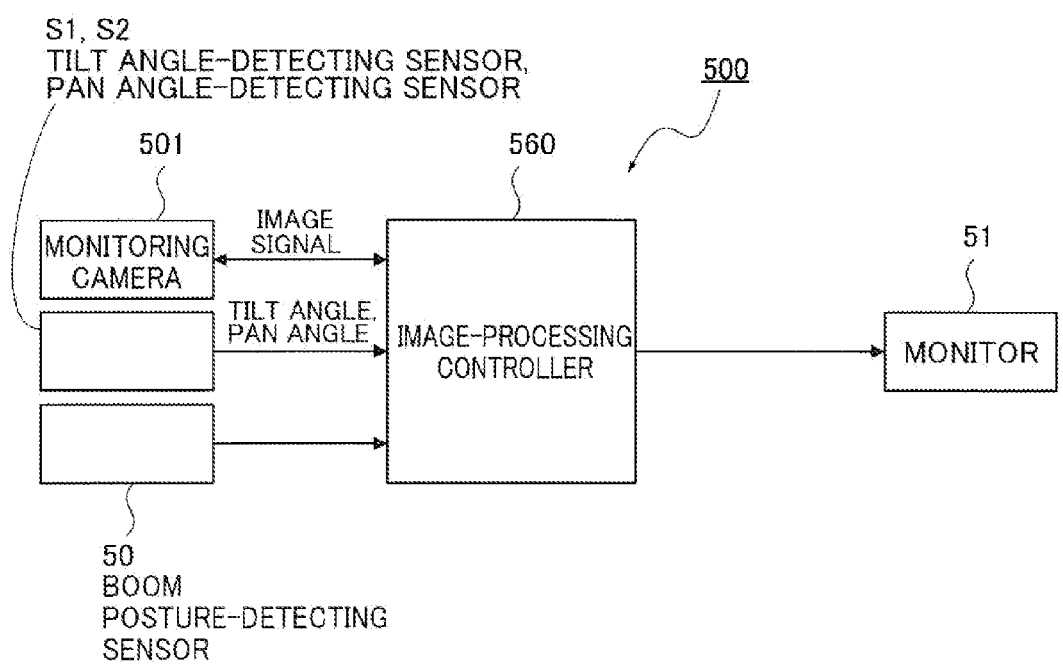
FIG. 22 is a block diagram which shows a configuration of a surrounding information-obtaining device in a fourth example.

FIG. 22 is a block diagram which shows a configuration of a surrounding information-obtaining device 500 in a fourth example.

The surrounding information-obtaining device 500 includes one monocular-monitoring camera (three-dimensional position-measuring device) 501 which is provided at the end portion of the telescopic boom 16 (see FIG. 1), a boom posture-detecting sensor 50 which detects a posture of the telescopic boom 16, a tilt angle-detecting sensor S1 and a pan angle-detecting sensor S2 which detect an inclination angle of the monitoring camera 501, an image-processing controller (three-dimensional position information-obtaining device) 560 which processes an image signal outputted from the monitoring camera 501, and obtains a height and the like of a construction I (see FIG. 24) as an imaged object, and the monitor 51 which displays an image imaged by the monitoring camera 501.

[Image-Processing Controller]

The image-processing controller 560 obtains a height of a building based on two images which have been imaged by the monitoring camera 501 in different positions, when the telescopic boom 16 moves from a storage position to a work start position (stand-by position), during movement of work, and the like.

Figure 23:
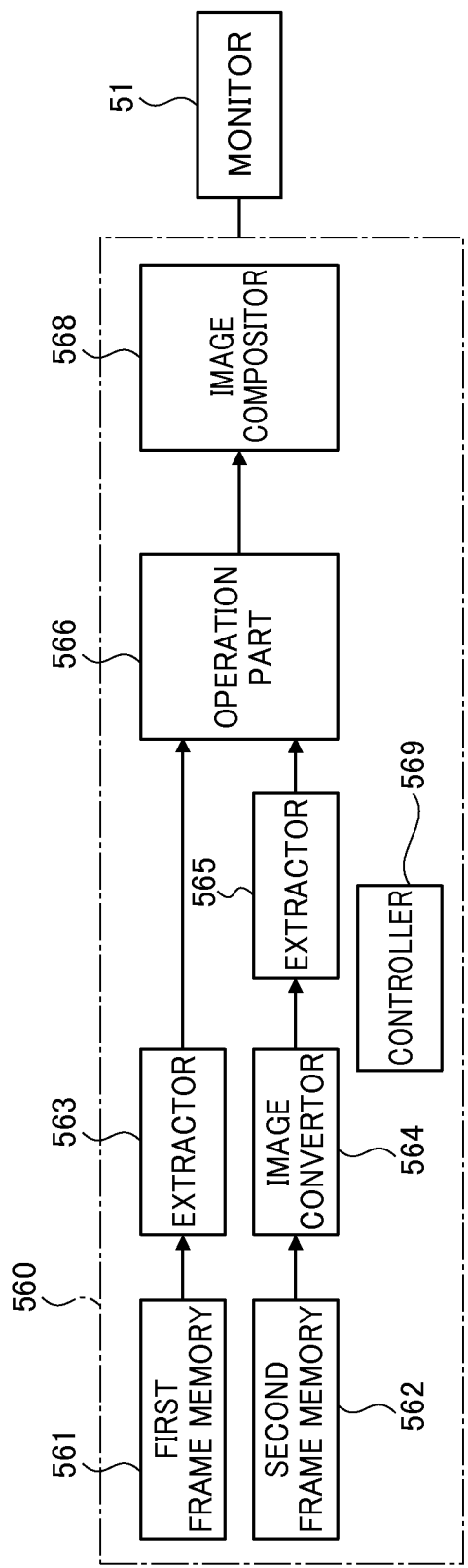
FIG. 23 is a block diagram which shows a configuration of an image-processing controller shown in FIG. 22.

As shown in FIG. 23, the image-processing controller 560 includes first and second frame memories 561, 562 each of which is an image-storing device which stores an image imaged by the monitoring camera 501 (see FIG. 24), an extractor 563 which extracts a feature point of a construction such as a building or the like from a first image which has been stored in the first frame memory 561, an image convertor 564 which converts a second image which has been stored in the second frame memory 562 to a predetermined image, an extractor 565 which extracts a feature point P of a construction I (see FIG. 24) such as a building or the like from the converted image converted by the image convertor 564, an operation part 566 which performs various calculations in which a distance between optical axes of the first and second images stored in the first and second frame memories 561, 562 is obtained, and from the distance, data detected by the boom posture-detecting sensor 50, and the like, a height of the construction I is obtained, an image compositor 568 which composites a numerical value representing the height of the construction I obtained by the operation part 566 with an image of the construction I, a controller 569 which controls the first and second frame memories 561, 562 to store an image which is being imaged by the monitoring camera 501, and controls the operation part 566 to perform calculation processing, and the like.

The extractor 563, the image convertor 564, the extractor 565, and the operation part 566 constitute an image calculation-processing device which obtains a three-dimensional position of the construction (object) I, and the image calculation-processing device and the image-storing device constitute a three-dimensional position information-obtaining device.

[Operation]

Next, operation of the surrounding information-obtaining device 500 structured as described above will be explained.

Figure 24:
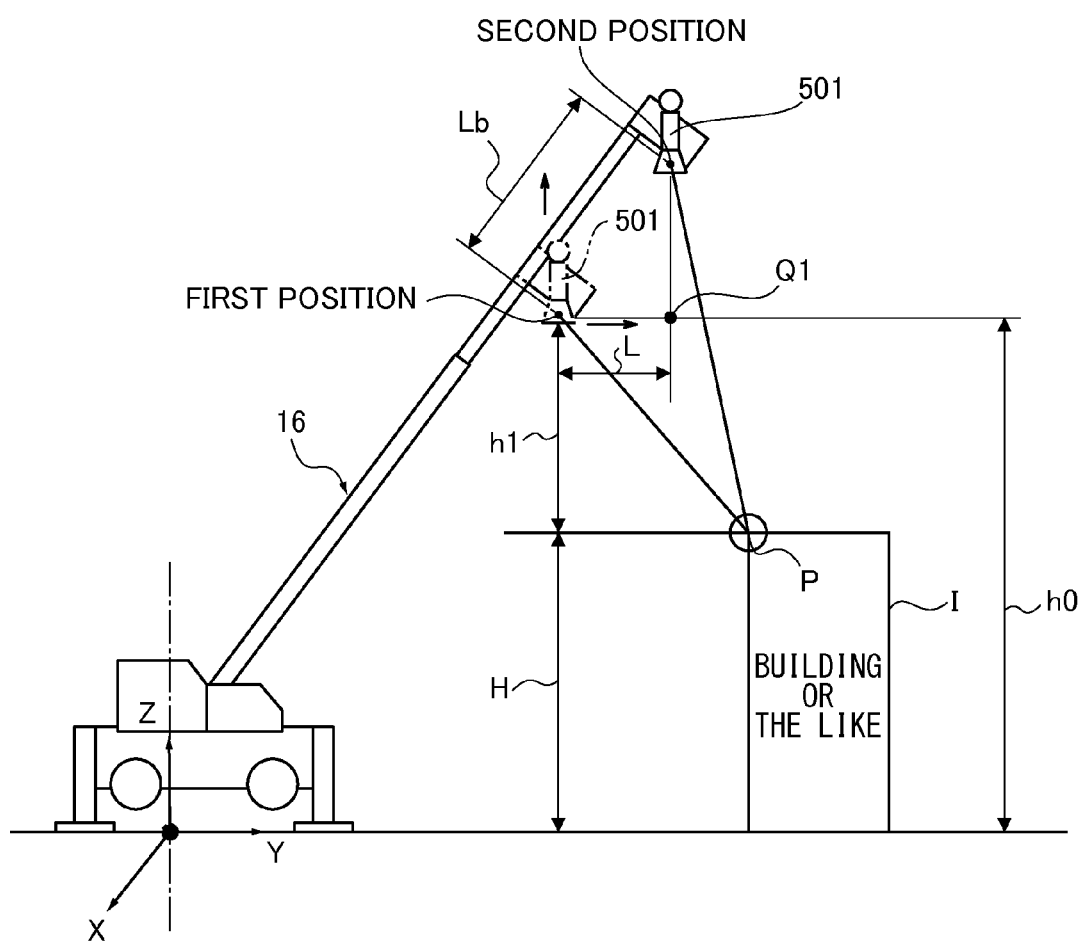
FIG. 24 is an explanatory diagram which shows that an imaging position is changed in accordance with extension of a telescopic boom.

In a case where the telescopic boom 16 is raised and extended from a storage position (not shown) to a work position as shown in FIG. 24, the monitoring camera 501 performs imaging in accordance with the extension of the telescopic boom 16, and an imaged image is displayed on the monitor 51. Here, explanation will be made where the monitoring camera 501 faces directly downward.

When the monitoring camera 501 comes to a position (first position) shown by a chain line shown in FIG. 24, that is, when the telescopic boom 16 is extended to a predetermined length, the controller 569 controls the first frame memory 561 to store an image imaged by the monitoring camera 501.

Figure 25A:
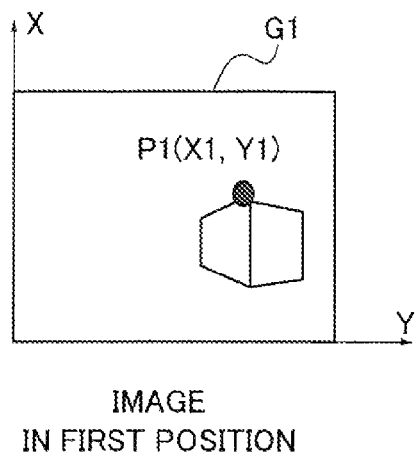
FIG. 25A is an explanatory diagram which shows an image imaged in a first position shown in FIG. 24.

When the image is stored in the first frame memory 561, the extractor 563 extracts an outline (edge) of the imaged image of the construction I by image processing, and additionally as shown in FIG. 25A, extracts a point P1 which is a corner portion of the construction I from the outline as a feature point by image processing, and obtains a position of the feature point P1 as a position (X1, Y1) on an image G1.

Additionally, when the monitoring camera 501 comes to a position (second position) shown by a solid line in FIG. 24 by the extension of the telescopic boom 16, that is, when the telescopic boom 16 is further extended from the predetermined length by a certain length Lb, the controller 569 controls the second frame memory 562 to store an image imaged by the monitoring camera 501.

When the image is stored in the second frame memory 562, the image convertor 564 converts the image stored in the second frame memory 562 to be an image which is imaged from a position Q1 where the monitoring camera 501 is in a position at the same height as the first position and moved to the right by L (in FIG. 24).

In this image conversion, geometry conversion is performed based on detection data detected by the boom posture-detecting sensor 50. This converted image is stored in a not-shown third frame memory if necessary.

Figure 25B:
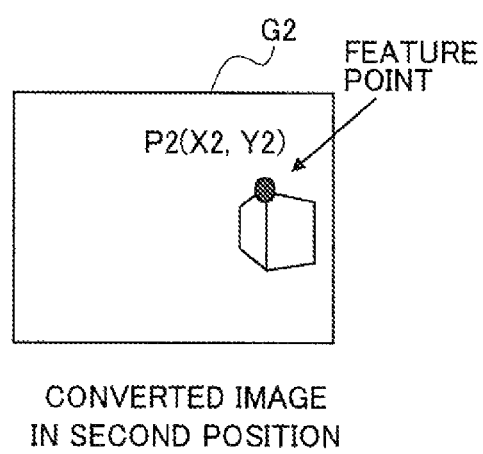
FIG. 25B is an explanatory diagram which shows an image imaged in a second position shown in FIG. 24.

The extractor 565 extracts an outline (edge) of the image of the same building (construction) as above by image processing based on a converted image G2 shown in FIG. 25B, further extracts a point P2 which is a corner portion from the outline as a feature point by image processing, and obtains a position of the point P2 as a position (X2, Y2) on the image G2.

[Principle]

Here, a principle in which a depth is obtained by stereo photographing will be explained briefly. Explanation to be made here is substantially the same as that explained in the third example; however, it will be made by a different method.

Figure 26:
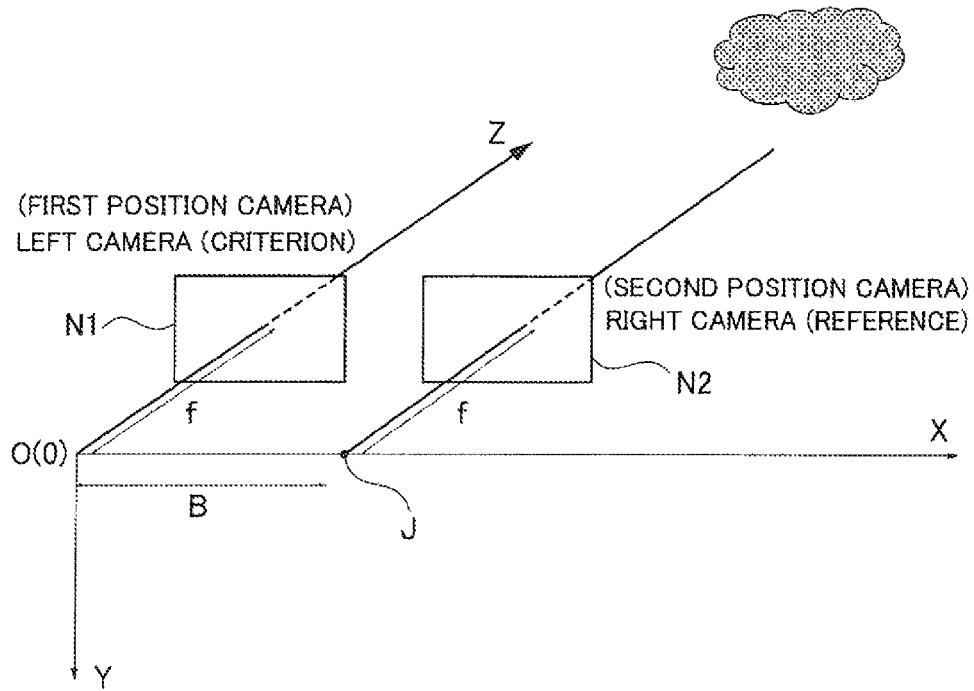
FIG. 26 shows a principle of a distance measurement to a photographic object by a stereo camera, and is an explanatory diagram which shows a positional relationship between left and right cameras, and a coordinate.

As shown in FIG. 26, as a coordinate system, a position O of a criterion camera is taken as an origin, and each of X, Y, and Z coordinate axes is set. A position J of a reference camera is expressed by (B, 0, 0), and a distance between both cameras is denoted by B.

Images obtained by the criterion camera and the reference camera are two-dimensional images of a target object in three dimensions projected on planes N1, N2 perpendicular to a Z axis=f, respectively. f denotes a focal length.

Additionally, image coordinates (x, y) are set on an image of the projected two-dimensional image. That is, on each of the planes N1, N2, each image coordinate (x, y) is set. Each image coordinate (x, y) is two-dimensional coordinates in which each of origins On 1, On 2 is taken as an image center, and each of image coordinate axes x, y is set parallel to each of an X axis and a Y axis in a three-dimensional space.

Figure 27:
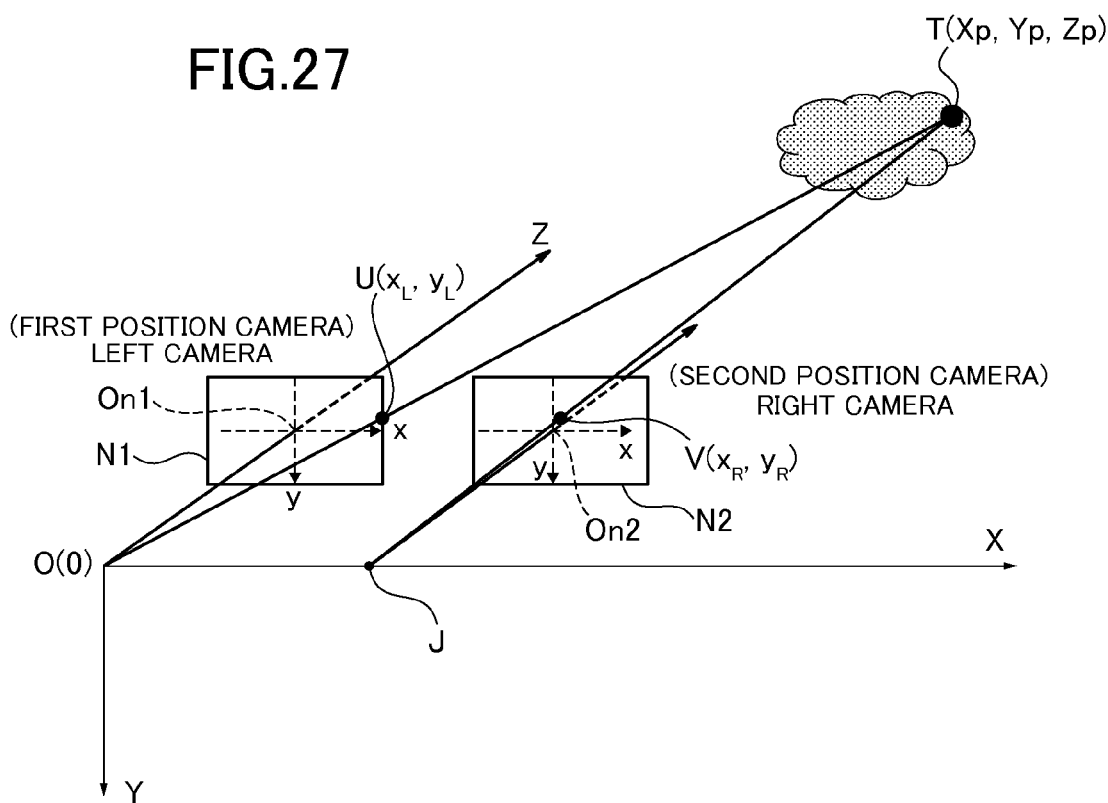
FIG. 27 is an explanatory diagram which shows a relationship between a point in a three-dimensional space and positions of the point on images imaged by the left and right cameras.

Assuming that a target point T (Xp, Yp, Zp) in the three-dimensional space shown in FIG. 27 is imaged by the two cameras (criterion camera and reference camera). At this time, the target point T appears in a position U ($x_L$, $y_L$) in an image of the plane N1 obtained by the criterion camera (left camera), and the target point T appears in a position V ($x_R$, $y_R$) in an image of the plane N2 obtained by the reference camera (right camera). However, when two same cameras are arranged parallel to the X axis, $y_L$=$y_R$.

Figure 28:
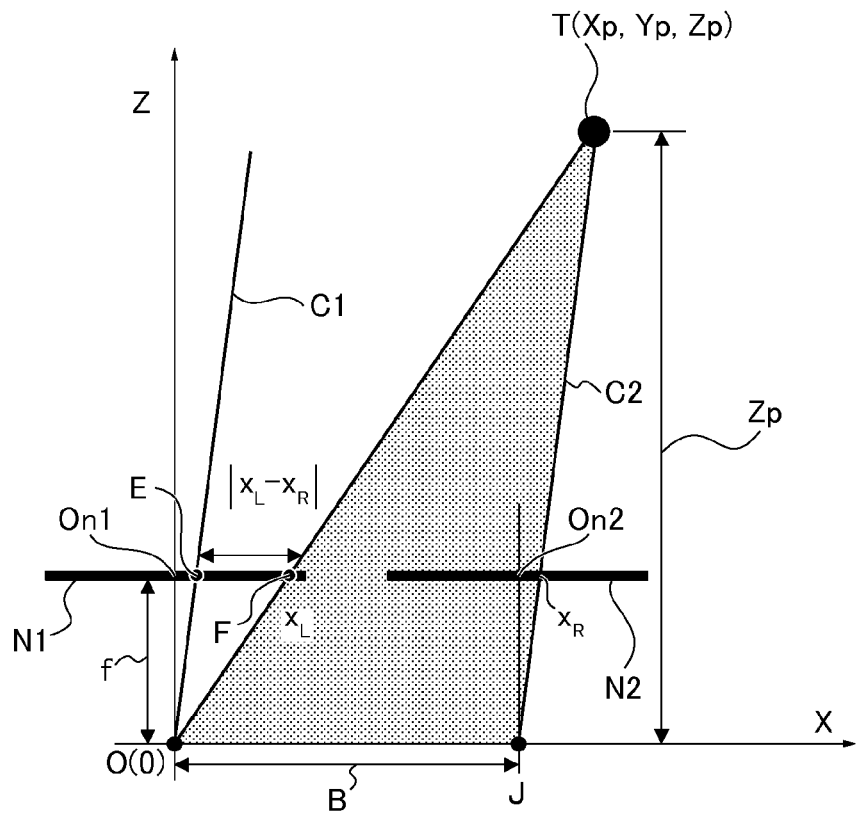
FIG. 28 is an explanatory diagram which shows that a position of the point in the three-dimensional space is capable of being obtained.

A depth Zp by triangulation is obtained by similarity of triangle. FIG. 28 is a diagram in which a state shown in FIG. 27 is viewed from above in a Y-axis direction, and a diagram projected in an X-Z plane.

A triangle (ΔTOJ) made by the target point T (Xp, Yp, Zp) in the three-dimensional space and the positions of the two cameras and a triangle (ΔOEF) made by the position O of the criterion camera and parallax on an image imaged by the criterion camera are similar. Please note that a straight line C1 and a straight line C2 shown in FIG. 28 are parallel.

The triangle (ΔTOJ) and the triangle (ΔOEF) are similar, and therefore, the following relational expression is established.

$$|x_L - x_R| : f = B : Zp \quad (1)$$

$x_R$−$x_L$ is parallax in a criterion plane (plane N1), and when it is represented by d, from the expression (1), the depth Zp is obtained as Zp=−Bf/d . . . (2)

Please note that in a camera arrangement in FIG. 27, it is always $x_L$>$x_R$, and since the parallax d is defined by $x_R$−$x_L$, a minus sign is attached to the above expression.

When the depth is obtained, by scaling, the target point (Xp, Yp, Zp) is obtained as follows.

That is, f:$x_L$=Zp:Xp, and Xp=$x_L$·Zp/f. And similarly, Yp=$y_L$·Zp/f.

Therefore, (Xp, Yp, Zp)=($x_L$·Zp/f, $y_L$·Zp/f, −Bf/d)=−B/d ($x_L$, $y_L$, f) . . . (3). That is, when the position U ($x_L$, $y_L$) in the image imaged by the left camera and the position V ($x_R$, $y_R$) in the image imaged by the right camera are obtained, a position of the point T is obtained by the expression (3). Please note that as a coordinate value of the image coordinates (x, y), values in the three-dimensional space are used.

In this example, as described above, the position (X1, Y1) of the feature point P1 (see FIG. 25) on the image G1 imaged in the first position shown in FIG. 28 and the position (X2, Y2) of the feature point P2 on the image G2 imaged in the position Q1 are obtained. Please note that as coordinate values of the positions (X1, Y1) and (X2, Y2), values in the three-dimensional space are used.

Therefore, when the criterion camera is taken as a first position camera, the reference camera is taken as a second position camera, and a moving distance L (see FIG. 24) in the horizontal direction of the monitoring camera 501 equivalent to the distance B between both cameras is obtained, the height H of the construction I is obtained by obtaining a distance h1 from the expression (3).

The operation part 566 shown in FIG. 23 obtains the moving distance L of the monitoring camera 501 from a detection signal detected by the boom posture-detecting sensor 50. That is, the operation part 566 obtains the moving distance L based on the luffing angle and the extended length of the telescopic boom 16.

The operation part 566 obtains the distance h1 in the vertical direction from a position of the monitoring camera 501 (see FIG. 24) in the first position to the construction I from the positions U ($x_L$, $y_L$) and V ($x_R$, $y_R$) of the images shown in FIG. 27 and the moving distance L based on the above expression (3).

Additionally, the operation part 566 obtains a height position h0 of the monitoring camera 501 in the first position shown in FIG. 24 from the detection signal detected by the boom posture-detecting sensor 50, and obtains the height H of the construction I from the distance h1 and the height position h0.

Here, the height H of the construction I is obtained; however, a feature point of a fixed object such as a material placed on the ground is extracted, and a height of the fixed object can be calculated by a similar method.

Figure 29:
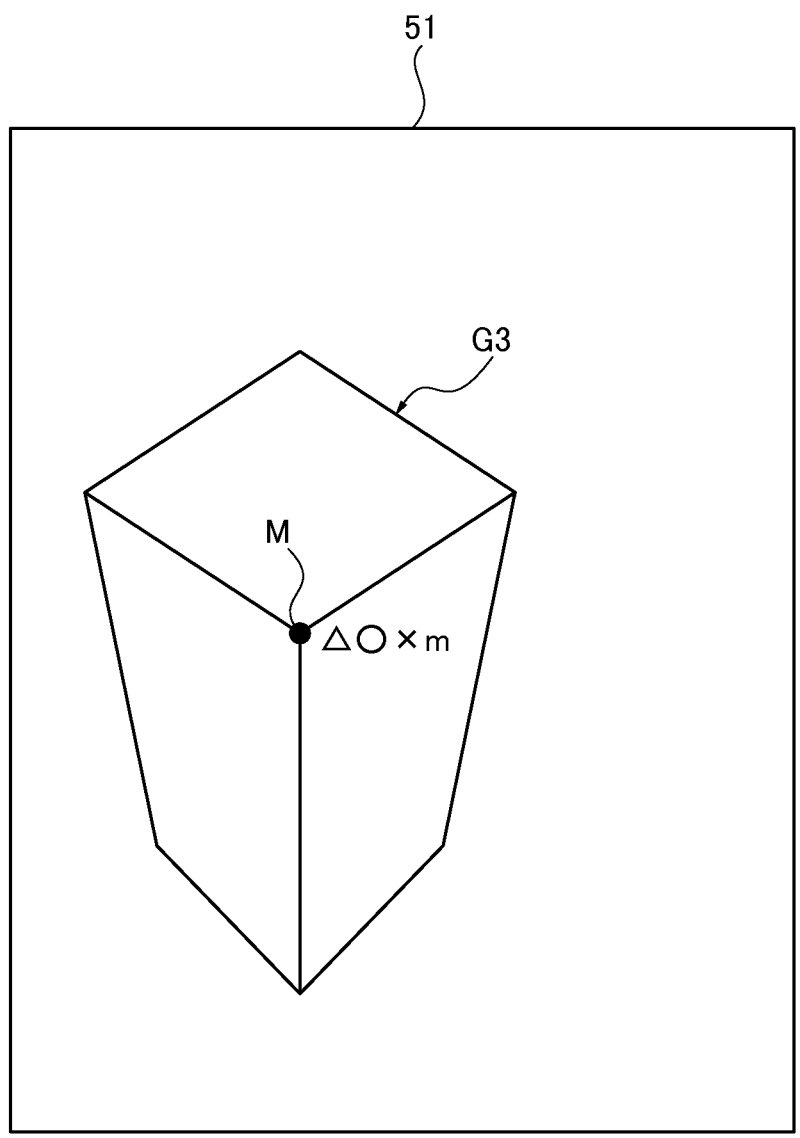
FIG. 29 is an explanatory diagram which shows one example of an image in which a mark which shows a position of an extracted feature point and an obtained height of a construction are composited and displayed.

The image compositor 568, as shown in FIG. 29, composites and displays a black circle mark M representing a position of an extracted feature point P1 (P2) and a numerical value representing the obtained height of the construction I on an image G3 of the construction I displayed on the monitor 51.

That is, the numerical value representing the height H is displayed in relation to the construction I so as to show that it represents the height of the construction I. Here, by displaying a black circle in the position of the feature point P1 (P2) and displaying a numerical value near the black circle, it can be seen that the height of the construction I is shown.

In a case where the monitoring camera 501 images other construction in addition to the construction I, similarly to the above, a feature point of the other construction is extracted, and a height of the other construction is obtained and displayed on the screen of the monitor 51.

Thus, images thus imaged by the monitoring camera 501 provided at the end portion of the telescopic boom 16 are different in imaging position in accordance with movement of the telescopic boom 16, and image processing is performed on one of the images different in height to the imaging position, and therefore, an image similar to that imaged by a stereo camera is obtained, and the height H of the construction I is obtained. Accordingly, it is possible to obtain the height H of the construction I by one monocular monitoring camera 501.

Additionally, since the monitoring camera 501 is provided at the end portion of the telescopic boom 16, it is also possible to obtain a height of a high construction I by extending the telescopic boom 16. Furthermore, by performing imaging by the monitoring camera 501 from a high position, it is possible to obtain a height of a construction within a surrounding area necessary for work, and make a stereogram within the surrounding area. Therefore, it is possible to further enhance safety at work.

Incidentally, in a case of performing extraction of an outline and feature points P1, P2 from an imaged image, as the height of the monitoring camera 501 becomes higher, the construction I appears smaller, and when the height of the monitoring camera 501 is low, the construction I appears large, and therefore, by roughening the number of pixels to extract the feature points P1, P2, and enhancing pixel density as the height becomes higher, it is possible to perform extraction of the feature points P1, P2 in a short time and perform calculation accurately. In this case, positions of the feature points P1, P2 can be obtained by performing calculation a plurality of times and calculating an average.

In the fourth example, the height of the construction I is obtained from the images imaged in the first and second positions; however, during extension of the telescopic boom 16, the height of the construction I is obtained continuously, and the height of the construction I can be determined from a state of distribution of the plurality of heights obtained.

When the height is measured while the telescopic boom 16 turns, the height of the monitoring camera 501 is constant, and therefore, it is possible to accurately obtain the height of the construction I. Accordingly, in a case where after the height of the construction I is obtained, the telescopic boom 16 is turned, the height of the construction I is obtained at the time of this turn, and the height of the construction I can be updated.

While the telescopic boom 16 is raised and the crane 10 is moved, when imaging is performed by the monitoring camera 501, it is possible to perform imaging from above throughout a wide range, and obtain a height of a construction within the wide range. Therefore, it is possible to make a stereogram within the wide range.

In the fourth example, a case where the monitoring camera 501 which performs imaging in the first and second positions faces directly downward has been explained; however, it is possible to obtain the height of the construction I by performing image processing so as to be an image imaged by the monitoring camera 501 which faces directly downward, even when the monitoring camera 501 is tilted or panned in the first position or in the second position,.

In the fourth example, the feature point of the construction is extracted from the imaged image, and the height of the feature point is obtained; however, it is not limited thereto, for example, a touch screen is provided on the screen of the monitor 51, and a desired portion of the image displayed on the screen is touched on the touch screen, and thus the height of the desired portion of the image can be obtained.

Figure 4:
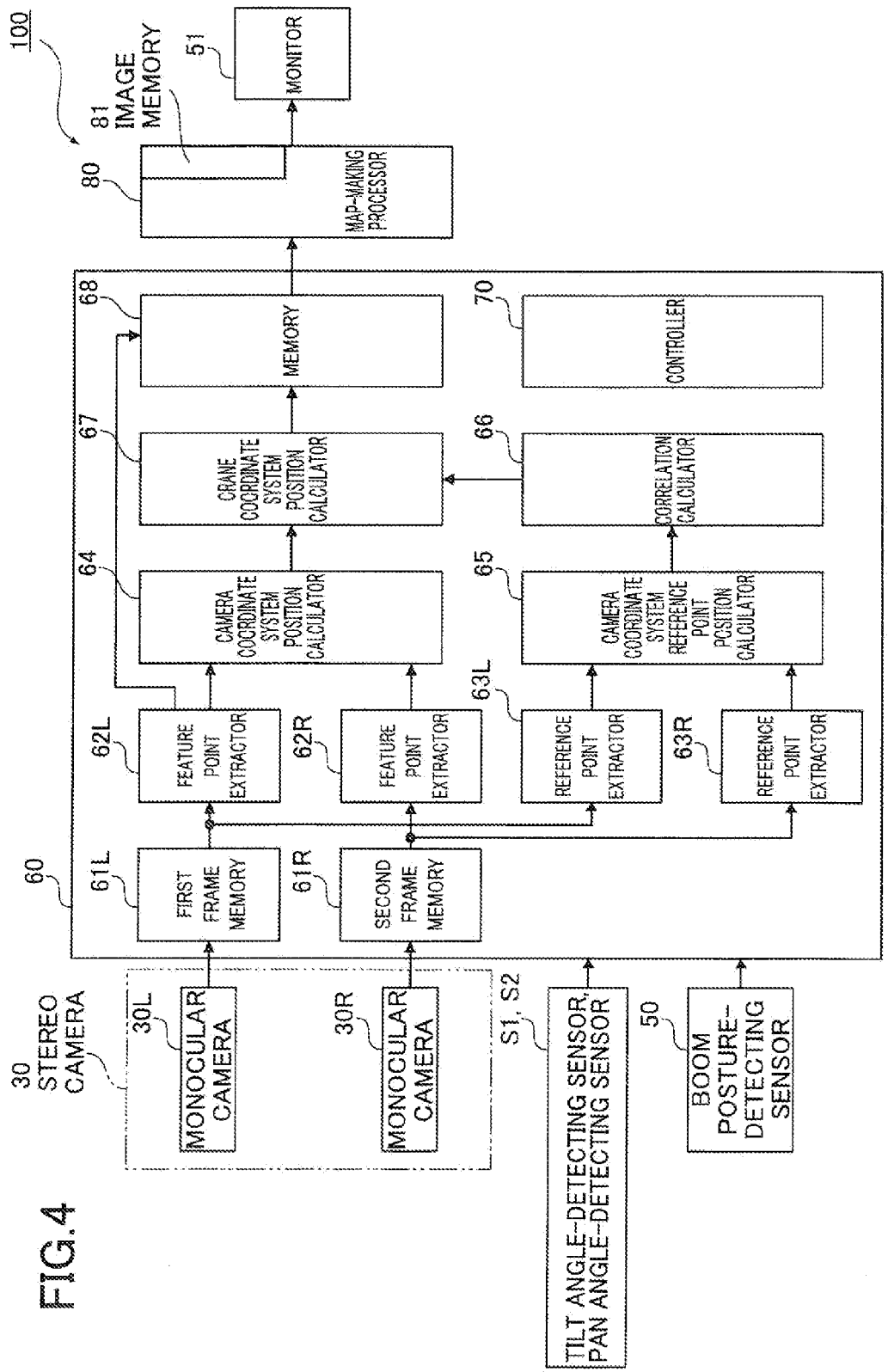
FIG. 4 is a block diagram which shows a configuration of an image-processing controller shown in FIG. 3.

Additionally, in the fourth example, a case of obtaining the height of the construction I has been explained; however, reference points P1 to P3, or the like are set similarly to in the first example, and it is possible to obtain a three-dimensional position of a feature point P of the construction I obtained by, for example, a turning center of the telescopic boom 16 which is taken as an origin, or a predetermined position Pd (see FIG. 12) which is taken as an origin. In this case, the reference point extractors 63L, 63R, the camera coordinate system reference point position calculator 65, the correlation calculator 66, and the crane coordinate system position calculator 67, which are shown in FIG. 4 in the first example, and the like are provided in the image-processing controller 560 shown in FIG. 22. Additionally, it is possible to obtain the three-dimensional position of the feature point P of the construction I by a similar method to in the third example.

Furthermore, it is possible to obtain the three-dimensional position of the construction I centering on the turning center of the telescopic boom 16 from the length, luffing angle, turning angle, and the like of the telescopic boom 16 by the operation part 566.

Although the present invention has been described in terms of exemplary embodiments, it is not limited thereto. It should be appreciated that variations may be made in the embodiments described by persons skilled in the art without departing from the scope of the present invention defined by the following claims.

CROSS-REFERENCE TO RELATED APPLICATIONS

The present application is based on and claims priority from Japanese Patent Application Number 2012-207769, filed Sep. 21, 2012, Japanese Patent Application Number 2012-260730, filed Nov. 29, 2012, Japanese Patent Application Number 2012-260731, filed Nov. 29, 2012, Japanese Patent Application Number 2013-020350, filed Feb. 5, 2013, Japanese Patent Application Number 2013-020351, filed Feb. 5, 2013, and Japanese Patent Application Number 2013-160884, filed Aug. 2, 2013, the disclosures of which are hereby incorporated by reference herein in their entireties.

The invention claimed is:

1. A surrounding information-obtaining device for a working vehicle, comprising:
    a three-dimensional position-measuring device which includes an imaging device which is installed at an end portion of a boom of the working vehicle and images a surrounding area of the working vehicle, and measures a three-dimensional position of a feature point of a surrounding construction in a crane coordinate system in which a predetermined position is taken as an origin by image recognition of an image imaged by the imaging device, and
    a three-dimensional position information-obtaining device which obtains three-dimensional position information of the construction from measured data of the three-dimensional position of the feature point of the surrounding construction measured by the three-dimensional position-measuring device,
    wherein the three-dimensional position information-obtaining device obtains three-dimensional position information of the construction by obtaining and storing a position of the construction around the working vehicle in a plane coordinate system in which the working vehicle is taken as a center and a height of the construction, while moving the boom.

2. The surrounding information-obtaining device for the working vehicle according to claim 1,
    wherein the three-dimensional position information-obtaining device calculates a position of the imaging device in the crane coordinate system based on a position of a reference point provided beforehand on the working vehicle on an image imaged by the imaging device, and obtains the three-dimensional position information based on the position of the imaging device.

3. The surrounding information-obtaining device for the working vehicle according to claim 2,
    wherein the reference point includes three points provided on the working vehicle.

4. The surrounding information-obtaining device for the working vehicle according to claim 1, comprising:
    a map-making processor which obtains the height of the construction in the surrounding area of the working vehicle from three-dimensional position information obtained by the three-dimensional position information-obtaining device, and makes a map as viewed in plan view which shows height information of the construction; and
    a display which displays a map made by the map-making processor.

5. The surrounding information-obtaining device for the working vehicle according to claim 1, wherein the three-dimensional position-measuring device is a stereo camera, and
    the three-dimensional position information-obtaining device has an image processor which processes an image imaged by the stereo camera, and
    the image processor has a calculator which calculates, based on an image including a reference object representing a height from the ground, a three-dimensional position of the reference object with respect to the stereo camera, and based on an image including the construction a three-dimensional position of which is to be obtained, a three-dimensional position of the construction with respect to the stereo camera, and calculates the three-dimensional position of the construction with respect to the three-dimensional position of the reference object.

6. The surrounding information-obtaining device for the working vehicle according to claim 5,
wherein the stereo camera is constituted of two monitoring cameras, and a distance between optical axes of the two monitoring cameras is defined as a baseline length, and the two monitoring cameras are arranged to place the end portion of the boom between them in a width direction.

7. The surrounding information-obtaining device for the working vehicle according to claim 6, comprising:
a monitor which is capable of switching and displaying an image imaged by either one of the two monitoring cameras.

8. The surrounding information-obtaining device for the working vehicle according to claim 7,
wherein on a screen of the monitor, an image imaged by a monitoring camera which is arranged on a side close to a driver's seat of the working vehicle of the two monitoring cameras is preferentially displayed.

9. The surrounding information-obtaining device for the working vehicle according to claim 1,
wherein the three-dimensional position-measuring device is a stereo camera, and the three-dimensional position information-obtaining device has an image processor which processes an image imaged by the stereo camera, and
the image processor has a calculator which calculates, based on an image including a reference object representing a height from the ground, a distance in a height direction from the stereo camera to the reference object, and calculates, based on an image including the construction the height of which is to be obtained, a distance in a height direction from the stereo camera to the construction, and calculates a height of the construction with respect to the reference object by subtracting the distance in the height direction to the construction from the distance in the height direction to the reference object.

10. The surrounding information-obtaining device for the working vehicle according to claim 9,
wherein the calculator calculates the height of the construction from the ground by adding a distance from the ground to the reference object.

11. The surrounding information-obtaining device for the working vehicle according to claim 1,
wherein the three-dimensional position-measuring device is a monocular camera which is installed at the end portion of the boom on the crane, and
the three-dimensional position information-obtaining device has an image-storing device which stores two images of first and second images imaged by the monocular camera, while the monocular camera moves in accordance with movement of the boom, and an image calculation-processing device which obtains a three-dimensional position of the construction which is being imaged from the two images of the first and second images stored in the image-storing device and a distance between optical axes of the first and second images.

12. The surrounding information-obtaining device for the working vehicle according to claim 11,
wherein the image calculation-processing device has an extractor which extracts a feature point of the construction from each of the first and second images, and an operation part which obtains a three-dimensional position of the construction based on a position of the feature point of the construction on each of the images extracted by the extractor and the distance between the optical axes.

13. The surrounding information-obtaining device for the working vehicle according to claim 11, wherein during the movement of the boom, the three-dimensional position of the construction is continuously obtained.

14. The surrounding information-obtaining device for the working vehicle according to claim 13, wherein when the boom is turned, the three-dimensional position of the construction already obtained is updated to a three-dimensional position obtained at the time of the turn.

15. A surrounding information-obtaining device for a working vehicle, comprising:
a three-dimensional position-measuring device which includes an imaging device, which is installed at an end portion of a boom of the working vehicle and images a surrounding area of the working vehicle, and measures a three-dimensional position of a feature point of a surrounding object in a crane coordinate system in which a predetermined position is taken as an origin by image recognition of an image imaged by the imaging device, and
a three-dimensional position information-obtaining device which obtains three-dimensional position information of the object from measured data of the three-dimensional position of the feature point of the surrounding object measured by the three-dimensional position-measuring device,
wherein the three-dimensional position information-obtaining device stores and obtains three-dimensional position information of an object around the working vehicle which is taken as a center while moving the boom, and the three-dimensional position information-obtaining device calculates a position of the imaging device in the crane coordinate system based on a position of a reference point provided beforehand on the working vehicle on an image imaged by the imaging device, and obtains the three-dimensional position information based on the position of the imaging device, and in a case where the imaging device has not imaged the reference point, a position of a target object a position of which from the reference point has been already obtained is taken as a new reference point, and the three-dimensional position information-obtaining device obtains three-dimensional position information of the object in the surrounding area of the working vehicle.

16. The surrounding information-obtaining device for the working vehicle according to claim 11,
wherein after fixing the working vehicle to a work position, the boom is moved and obtaining of three-dimensional position information is started.

17. The surrounding information-obtaining device for the working vehicle according to claim 15, comprising:
a map-making processor which obtains a height of the object in the surrounding area of the working vehicle from three-dimensional position information obtained by the three-dimensional position information-obtaining device, and makes a map as viewed in plan view which shows height information of the object; and a display which displays a map made by the map-making processor.

* * * * *